(12) United States Patent
Robinson et al.

(10) Patent No.: US 11,398,167 B2
(45) Date of Patent: Jul. 26, 2022

(54) TIME TEMPERATURE INDICATOR LABEL

(71) Applicant: Intray Ltd, Cheshire (GB)

(72) Inventors: John Robinson, Lancashire (GB); Stephen Wintersgill, Rochdale (GB); Andy Hancock, Northumberland (GB); Martin Peacock, Hertfordshire (GB); Sarah Akbar, Walsall (GB); Brunella Maranesi, Newcastle upon Tyne (GB)

(73) Assignee: Intray Ltd., Cheshire (GB)

( * ) Notice: Subject to any disclaimer, the term of this patent is extended or adjusted under 35 U.S.C. 154(b) by 648 days.

(21) Appl. No.: 16/316,650

(22) PCT Filed: Jul. 11, 2017

(86) PCT No.: PCT/GB2017/052033
§ 371 (c)(1),
(2) Date: Jan. 10, 2019

(87) PCT Pub. No.: WO2018/011565
PCT Pub. Date: Jan. 18, 2018

(65) Prior Publication Data
US 2020/0043377 A1    Feb. 6, 2020

(30) Foreign Application Priority Data
Jul. 11, 2016    (GB) .................................... 1612003

(51) Int. Cl.
*G09F 3/00* (2006.01)
*G01K 3/04* (2006.01)
(Continued)

(52) U.S. Cl.
CPC ............. *G09F 3/0291* (2013.01); *G01K 3/04* (2013.01); *G01N 31/229* (2013.01); *G04F 1/00* (2013.01)

(58) Field of Classification Search
CPC ...... G09F 3/0291; G01K 3/04; G01N 31/229; G04F 1/00
See application file for complete search history.

(56) References Cited

U.S. PATENT DOCUMENTS 3,018,611 A * 1/1962 Biritz ........................ G04F 1/00
368/89
3,520,124 A * 7/1970 Myers ...................... G07C 1/30
368/92

(Continued)

FOREIGN PATENT DOCUMENTS

CN     85100602 A    7/1986
CN     1325332 A    12/2001

(Continued)

OTHER PUBLICATIONS

Search Report issued from the United Kingdom Patent Office for related Application No. GB1612003.2 dated Apr. 19, 2017 (4 pages).

(Continued)

*Primary Examiner* — Nimeshkumar D Patel
*Assistant Examiner* — Tania Courson
(74) *Attorney, Agent, or Firm* — Michael Best & Friedrich LLP

(57) ABSTRACT

A time-temperature integrating (TTi) indicator label comprises an initiator reservoir and a target reservoir, said initiator reservoir containing a pH modification system and said target reservoir comprising a pH responsive indicator. The pH responsive indicator may be photo-initiated. There is also provided a time-temperature indicator label comprising first and second reservoirs separated by a hydrogel valve, said valve allowing passage of an acid from said first reservoir to said second reservoir when the hydrogel valve is activated.

22 Claims, 11 Drawing Sheets

(51) Int. Cl.
*G01N 31/22* (2006.01)
*G04F 1/00* (2006.01)

(56) References Cited

U.S. PATENT DOCUMENTS

| | | | |
|---|---|---|---|
| 3,942,467 A | 3/1976 | Witonsky | |
| 4,212,153 A * | 7/1980 | Kydonieus | G04F 1/00 116/207 |
| 4,229,813 A * | 10/1980 | Lilly | G04F 13/06 116/206 |
| 4,292,916 A * | 10/1981 | Bradley | G01K 3/04 116/205 |
| 4,664,056 A | 5/1987 | Jehanno | |
| 4,737,463 A | 4/1988 | Bhattacharjee et al. | |
| 4,987,849 A * | 1/1991 | Sherman | B65D 79/02 116/200 |
| 5,053,339 A * | 10/1991 | Patel | G01N 31/229 436/2 |
| 6,231,229 B1 | 5/2001 | Halderman | |
| 6,741,523 B1 * | 5/2004 | Bommarito | G01K 3/04 116/220 |
| 6,916,116 B2 * | 7/2005 | Diekmann | G01K 3/04 116/216 |
| 7,232,253 B2 * | 6/2007 | Isbitsky | G01K 3/04 368/89 |
| 7,290,925 B1 * | 11/2007 | Skjervold | G01N 31/229 374/106 |
| 7,593,290 B2 * | 9/2009 | Stange | A46B 15/0002 116/206 |
| 7,940,605 B2 * | 5/2011 | Ambrozy | G01K 5/48 368/327 |
| 8,104,949 B2 | 1/2012 | Robinson et al. | |
| 8,166,906 B2 | 5/2012 | Ambrozy et al. | |
| 8,936,693 B2 | 1/2015 | Manes et al. | |
| 9,235,194 B2 * | 1/2016 | Higgins | G04F 1/00 |
| 9,556,308 B1 | 1/2017 | Waymouth et al. | |
| 9,689,749 B2 * | 6/2017 | Rohr | G01K 3/04 |
| 10,451,595 B2 * | 10/2019 | Patel | G07C 1/00 |
| 10,677,660 B2 * | 6/2020 | Yuasa | C09K 3/00 |
| 10,816,410 B2 | 10/2020 | Salman | |
| 10,908,031 B1 * | 2/2021 | White | G01K 3/04 |
| 2007/0036038 A1 | 2/2007 | Ambrozy et al. | |
| 2008/0210152 A1 | 9/2008 | Robinson et al. | |
| 2010/0322037 A1 * | 12/2010 | Robinson | G04F 1/00 368/89 |
| 2014/0024057 A1 | 1/2014 | Passavant et al. | |
| 2014/0220987 A1 | 8/2014 | Wu | |
| 2015/0050196 A1 | 2/2015 | Chan et al. | |
| 2016/0161919 A1 * | 6/2016 | Patel | G01N 31/229 73/1.42 |
| 2020/0209160 A1 | 7/2020 | Robinson et al. | |

FOREIGN PATENT DOCUMENTS

| | | |
|---|---|---|
| CN | 1638954 A | 7/2005 |
| CN | 1746199 A | 3/2006 |
| CN | 201159676 Y | 12/2008 |
| CN | 101611115 A | 12/2009 |
| CN | 201548345 U | 8/2010 |
| CN | 101851336 A | 10/2010 |
| CN | 101894498 A | 11/2010 |
| CN | 202202420 U | 4/2012 |
| CN | 102785424 A | 11/2012 |
| CN | 103024810 A | 4/2013 |
| CN | 103048063 A | 4/2013 |
| CN | 104361826 A | 2/2015 |
| CN | 204330175 U | 5/2015 |
| CN | 105136330 A | 12/2015 |
| EP | 2799028 A1 | 11/2014 |
| EP | 1228366 B1 | 4/2015 |
| EP | 2697617 B1 | 2/2016 |
| GB | 1366797 A | 9/1974 |
| GB | 2552167 A | 1/2018 |
| JP | S63502772 A | 10/1988 |
| JP | 2005046367 A | 2/2005 |
| JP | 2007154063 A | 6/2007 |
| WO | 8703367 A1 | 6/1987 |
| WO | 03/007088 A2 | 1/2003 |
| WO | 2007009103 A2 | 1/2007 |
| WO | 2009/040547 A2 | 4/2009 |
| WO | 2011080375 A1 | 7/2011 |
| WO | 2011/092461 A2 | 8/2011 |
| WO | 2012/141593 A2 | 10/2012 |
| WO | 2012/162469 A3 | 11/2012 |
| WO | 2017060676 A1 | 4/2017 |

OTHER PUBLICATIONS

International Search Report with Written Opinion for related Application No. PCT/GB2017/052033 dated Oct. 4, 2017 (10 pages).
International Preliminary Report on Patentability for related Application No. PCT/GB2017/052033 dated Jan. 15, 2019 (7 pages).
Chinese Patent Office First Office Action for Application No. 201780054747.7 dated Jun. 30, 2020 (31 pages including English translation).
United Kingdom Intellectual Property Office Search Report for Application No. GB1800698.1 dated May 31, 2018 (3 pages).
United Kingdom Intellectual Property Office Search Report for Application No. GB1800698.1 dated Mar. 21, 2018 (4 pages).
International Preliminary Report on Patentability for Application No. PCT/GB2018/051950 dated Jan. 23, 2020 (10 pages).
International Search Report and Written Opinion for Application No. PCT/GB2018/051950 dated Oct. 18, 2018 (12 pages).
Chinese Patent Office Second Office Action for Application No. 201780054747.7 dated May 4, 2021 (28 pages including English translation).
Japanese Patent Office Notice of Reasons for Refusal for Application No. 2019-501671 dated Jun. 22, 2021 (9 pages including English translation).

* cited by examiner

TIME TEMPERATURE INDICATOR LABEL

The present invention relates to a time and temperature integrating (TTi) indicator label, particularly but not exclusively, a time indicator device suitable for use on food and other perishable products, such as pharmaceuticals and cosmetics. Preferably said indication takes the form of a traffic light sequence, beginning in a 'green state' indicating that everything is alright, transitioning to an amber/caution state and finally a red, do not use condition. The use of a traffic light system is preferred due to the universally recognisable colour signals. Preferably, the TTi indicator label is photoinitiated.

The present invention will be described with reference to its use on food products, however it is recognised and will be readily apparent that the invention could also find application in other fields such as pharmaceutical products, cosmetics and any other products which have a limited life.

There are currently a number of different target dates provided to the consumer as indicators of the likely level of freshness of food (and other perishable) products. The current practice is to provide one or more of the following: a 'Sell By' date; a 'Best Before' date; a 'Use by' date; and/or a 'Once opened, use within' date.

A 'Sell By' date, the date after which the retailer should no longer offer a product for sale, is an indicator to the retailer of the expected shelf life of a product, but provides the consumer with no useful information as to how long after this date a product is still safe or desirable to consume.

A 'Best Before' date, the date after which the product may not be at its premium quality of performance. This does provide the consumer with an indication of the 'best product life', but is not an indicator of the actual freshness or safety or efficacy of a product. Furthermore, this date is generally only a reliable measure if the primary packaging is in an unopened state and the product has been stored properly.

A 'Use by' date, the date after which a product is notionally no longer safe to consume (the product may still be safe, but the retailer/manufacturer will no longer warrant such). Again, this date relies on the integrity of the primary product packaging and also appropriate storage conditions.

A 'Once opened, use within XX days' date, attempts to reflect the accelerated decay of the produce following breach of the primary packaging. Whilst the use of a 'Once opened, use within XX days' date is an advance on the previous state of the art, its effectiveness relies totally on the consumer remembering when a product was first opened. This is more evident when the open life is short (e.g. 3 days for orange juice); however, some products have an open life of several weeks or even months, at which point the consumer's memory becomes an unreliable measure, with people tending to rely on 'self preservation' i.e., the smell or visual appearance of the product. This is unsatisfactory both for the consumer, who will get poor performance from the product, or who may suffer an upset stomach or other such complaint as a result of eating tainted food, and also for the manufacturer, who will probably lose a future customer, due to their dissatisfaction with the product. This date also relies on the produce being stored in appropriate conditions after opening.

In addition, wastage is becoming a global issue, driven by US and EU government agencies, and any progress in active and intelligent packaging is seen as a primary driver to impact positively upon and to reduce global wastage. From a consumer's and retailer's perspective, the use of 'Sell By', 'Best Before', 'Use By', and 'Once Opened, use within XX days' on packaging may result in perishable products being discarded unnecessarily or consumed when they are no longer suitable for consumption as these dates do not take account of the conditions in which a product is stored. Incorrect storage of a perishable product may shorten the lifespan of the product, meaning that the product becomes unusable sooner than indicated on the packaging, but this is not reflected in the 'Use By' date.

Clearly there is a need, both from the manufacturer's, retailer's and the consumer's perspective, for a simple, inexpensive and reliable indicator on such perishable product containers in order to better safeguard the consumer's health, assist the consumer in better consumption habits or management, reduce wastage, and also to improve customer's perception of the manufacturers product. A number of means to accomplish this objective have been attempted in the past and are known in the art; however, all have their drawbacks.

In some earlier devices the timing mechanism is activated upon manufacture or application of the device, whereas in other devices user initiation is employed. Both these systems have inherent problems, certain devices are acceptable as 'Use By' indicators, but due to their initiation at manufacture this can take no account of the accelerated rate of product decay upon breach of primary packaging exposing the product to oxygen, locally introduced bacteria and other suchlike present in the atmosphere. Equally the user-activated devices rely on a consumer remembering to activate the device upon opening their product, this is easily forgotten and could leave unaffected exactly the problems they are intended to address.

A few attempts have been made to address the aforementioned shortcomings of the above products. For example, a reservoir may be breached by the act of opening the closure/lid of a container holding the perishable product. A multi-component lid can be used with various moving parts designed to puncture a reservoir containing a reactive compound. These devices borrow heavily from known art in the field of tamper evidence and suffer from the same main drawback, which is that a multi-component lid/closure is difficult to manufacture and assemble and therefore too costly to gain mainstream commercial acceptance.

Various attempts to overcome these issues have been made in the past, the most relevant of which are discussed below.

U.S. Pat. No. 8,104,949 B2 (ROBINSON et al.) provides a time temperature indicator label comprising first and second interconnected reservoirs containing first and second liquids respectively, a first barrier being provided between said first and second liquids to prevent said liquids mixing, wherein said first barrier is connected via a conduit to a third reservoir containing a third liquid which is adapted to pass along said conduit over a first predetermined time period and to effect removal of said first barrier upon contact to facilitate mixing of said first and second liquids and generation of a first liquid mixture within the second reservoir of different colour to the second liquid prior to mixing and thereby provide an indication of when said first predetermined time period has elapsed.

In the preferred embodiment of ROBINSON et al. the barrier discussed above is a lipid plug, which is subsequently broken down by an enzyme present in said third liquid. The problem with this is linked to an intrinsic problem of using fine capillaries to transport reactive label components. Due to the restrictive size of the capillaries, bulk transport of fluids is impossible, hence it is only possible to deliver a steady drip drip of enzyme to the lipid plug, this means that the rate at which the plug can be broken down is severely restricted, placing concomitant restrictions on the timescales over which such a label can be effective. Furthermore, the lipid plug is likely to be broken down both slowly and preferentially along the side from which the enzyme is delivered thereto, this could easily lead to partial breakdown of the plug resulting in leakage past the barrier in a retarded manner, thereby delivering a slow and gradual colour change, rather than a more desirable, rapid transition.

Whilst this development overcomes some of the issues discussed above, the construction of a label to the specifications outlined is both technically and physically very challenging, thereby reducing the speed at which such a label could be manufactured, bringing with it inherent cost implications. The complexity of design and construction, and the proportion of label failures which could result from such an approach, would render any such solution partial and unreliable at best. The complexity of manufacture is described in graphic detail in the related U.S. Pat. No. 8,936,693 B2 (MANES et al.). The die cutting and laminating down of the capillary elements (used for timing) presents particular challenges in terms of uniformity, integrity and the propensity for media losses through thin film evaporation.

A further difficulty in the manufacture of labels as per the ROBINSON et al. patent is the materials handling issues arising from the application of liquid components into a multi-layered label wherein many of the layers are very thin films (of the order of 10-20 microns) and sealing thereafter. This issue has been partially addressed (albeit inadvertently) by KEEP-IT TECHNOLOGIES in both EP 1,228,366 B1 and EP 2,697.617 B1, both of which use hydrogel polymer matrices to immobilise liquid components. However, that is the only lesson taken from these patents in this instance, as beyond this their teaching, diverges somewhat from the objects of the present invention.

An object of the present invention is to obviate or mitigate one or more of the problems and/or drawbacks associated with prior art time indicator devices mentioned above.

The terms acid generator and/or acid generation are used herein to refer to either a system which produces an acid via chemical reaction or releases an acid, subsequent to exposure to a pre-defined stimulus. The term 'photo acid generator', also referred to as a 'photo-initiated acid generator' or 'PAG', is used herein to refer to a system which produces an acid via chemical reaction or releases an acid, subsequent to exposure to light. Preferably, the photo acid generator is activated on exposure to visible light, although it will be appreciated that photo acid generators that are activated by non-visible light, such as UV light or IR light, may also be used.

The term hydrogel polymer refers to a group of chemicals which are hydrophilic, with extraordinarily high rates of absorption of aqueous media, said aqueous media being entrapped within said hydrogels. Common uses for hydrogels include nappy linings, women's sanitary products, desiccant pouches, medical applications such as burns dressings, optical contact lenses, and some materials used in hydroponic growing systems. Typically with hydrogels, once an aqueous medium has been absorbed, it remains entrapped within the hydrogel polymer matrix and is thereby prevented from interacting with outside media.

The term stimuli-responsive hydrogel polymer refers to a subset of hydrogel polymers as defined above. Stimuli-responsive hydrogel polymers which are responsive to light, pH, magnetism, electricity, ionic strength, temperature, and enzymatic action are known, the response generally being to de-swell, that it to say that, upon exposure to the relevant stimulus, the hydrogel becomes hydrophobic, contracts, and releases some or all of the aqueous media previously entrained therein. In this way, hydrogel polymers may be used to provide a plug which can operate as a valve when stimulated.

According to a first aspect of the present invention there is provided a time-temperature indicator label comprising an initiator reservoir and a target reservoir, said initiator reservoir containing a pH modification system and said target reservoir comprising a pH responsive indicator.

Preferably, the time-temperature indicator label is a photoinitiated time-temperature indicator label. By photoinitiated, it will be understood that this indicates that the timing mechanism of the label is activated by exposure to light.

In an embodiment, the pH modification system is a photoinitiated pH modification system. As such, the timing mechanism of the label is activated when the pH modification system is exposed to light.

The invention according to the first aspect of the present invention thereby provides a consumer with a clear and reliable visual indication of how safe a particular perishable item, such as a foodstuff, pharmaceutical, or cosmetic, is to use. Further, the use of a photoinitiated pH modification system obviates the need for consumers to recall when the perishable item was first opened. The label may be activated automatically when the perishable item is first opened by having the opening of the item automatically expose the photoinitiated pH modification system to light. Previous time-temperature indicator labels relied on the physical breakage of a portion of the label to begin the timing mechanism. It has been surprisingly realised that time-temperature indicator label may be photoinitiated. Photoinitiation has the benefit of making the activation of the timing mechanism more reliable and also makes the label less complex to produce and/or affix to the container. In addition, prior art labels which are activated by the application of slight pressure to breach a barrier and allow components to mix are susceptible to inadvertent activation during manufacture, transport, or general handling. In contrast, since the present label is photoinitiated rather than pressure initiated, there is no risk of the timing mechanism of the label being inadvertently activated by a slight knock.

In an embodiment, the label is activated automatically when the item or packaging to which it is attached is opened for the first time. The label may be activated by the removal of a light-impermeable layer being removed to expose at least a portion of the photoinitiated pH modification system to light. In another embodiment, the label may be activated before the perishable item is purchased by the consumer. For example, the label may be applied to a perishable item when the item is being packaged. The label may then be exposed to a light source, such as a visible light source or a UV light source, such that the timing mechanism is started before the product is purchased. This may be useful for products which have a limited life, even if the packaging remains unopened.

Preferably, the pH modification system is activated by visible light, UV light and/or IR light. The pH modification system may be activated by exposure to light having a wavelength of from around 100 nm to around 1000 nm. Preferably, the pH modification system is activated by exposure to light having a wavelength of from around 200 nm to around 900 nm, preferably around 400 to 700 nm. The photoinitiated pH modification system may be activated by exposure to light having a wavelength of from around 400 nm to around 450 nm. The pH modification system is preferably activated by exposure to ambient light, which may include natural and/or artificial light.

Said pH modification system is preferably an acid generation system. Preferably, said acid generation system comprises a photo-initiated acid generation system. In other embodiments, the pH modification system may be an alkali/base generation system.

Said initiator reservoir and said target reservoir may be physically separate reservoirs, alternatively, they may be different portions of the same reservoir. The label may comprise an initiator reservoir, an accumulator reservoir, and a target reservoir. The reservoirs may be separate reservoirs, or they may be different portions of the same reservoir. The reservoirs may be separated by one or more removable barriers. The one or more removable barriers may divide a reservoir into the initiator reservoir, accumulator reservoir, and/or target reservoir.

Preferably, the photo-initiated acid generation system is substantially irreversible or the reaction kinetics are such that the reverse reaction is much slower than the forward reaction that is activated by exposure to light. If the photo-initiated acid generation system were to be reversible or the photo-initiated acid generation system reverted to its initial composition when light exposure was stopped, when the label is returned to a darkened area, such as a refrigerator or cupboard, or is left out at night, the acid-generating reaction may reverse, causing the pH to increase and thereby effectively resetting the timing mechanism of the label.

Preferably, the photo-initiated acid generation system is cationic. Preferably, after initial exposure to light, the acid-producing reaction continues even in darkness, to continue to generate acid.

Preferably, said acid generation system comprises a silver halide salt, most preferably silver chloride.

In a preferred embodiment, the acid generation system comprises a photo-initiated acid generator (PAG). Any suitable PAG may be used. The PAG may be an onium salt. An onium salt has the general formula $Ar^+ MF_6^-$(aq) and breaks down due the absorption of a photon to form ArOH and $H^+$ $MF_6^-$. The $Ar^+$ may be the cation of an aryl onium salt, such as triphenyl sulphonium, and the anion M may be any suitable atom, such as antimony (Sb) or phosphorus (P). It will be appreciated that any PAG which has a stable conjugate-base anion after it donates a proton could be used, for example a PAG comprising a $BF_4^-$ moiety.

Examples of suitable PAGs include tri-aryl sulphonium salts, such as triarylsulfonium hexafluorophosphate (TAS), diphenyliodonium hexafluorophosphate (DPI), or triphenylsulfonium triflate (TPS-oTf), Irgacure PAG 290 (sulfonium tetrakis[pentafluorophenyl] borate), Speedcure 938 (Bis-(4-t-butylphenyl)-Iodonium hexafluorophosphate), Irgacure PAG 103 (Benzeneacetonitrile, 2-methyl-α-[2-[[(propylsulfonyl)oxy]imino]-3(2H)-thienylidene]) and Irgacure 121 (Benzeneacetonitrile, 2-methyl-α-[2-[[[(4-methylphenyl)sulfonyl]oxy]imino]-3(2H)-thienylidene], and di-phenyl iodonium heaxfluorophosphate.

Tri-aryl sulphonium salts are readily available as a mixture of the two salts shown below in a 50% w/w solution in propylene carbonate:

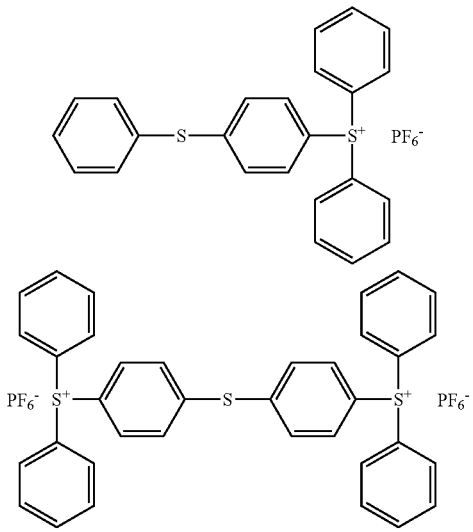

The PAG may comprise non-ionic photo-initiated acid generators. The non-ionic PAGs may rely on photo-initiated cleavage of bonds to produce acids. For example, arylketosulphinates and o-nitrobenzyl esters can undergo photoinitiated cleavage to produce sulphinic acid or sulphonic acid. On exposure to UV light, arylketosulphinates cleave at the beta position, releasing arylsulphinic radicals which readily abstract hydrogen from neutral donors, such as esters, ethers, or similar, to generate sulphinic acid. The reaction mechanism for o-nitrobenzyl esters is similar and generates p-toluenesulphonic acid. Naphthoquinone diazide and derivatives thereof are able to produce indene-3-carboxylic acid via the photo-induced elimination of nitrogen followed by reaction with water.

The PAG may comprise an oximinosulphonate compound, which generates sulphonic acid in the presence of a suitable proton donor, which is generally the solvent. Example of such PAGs include Irgacure 103 (Benzeneacetonitrile, 2-methyl-α-[2-[[(propylsulfonyl)oxy]imino]-3 (2H)-thienylidene]), and Irgacure 121 (Benzeneacetonitrile, 2-methyl-α-[2-[[[(4-methylphenyl)sulfonyl]oxy]imino]-3 (2H)-thienylidene], which are commercially available from BASF.

The pH modification system preferably comprises sufficient PAG to lower the pH of the associated accumulator reservoir along substantially the whole length of the accumulator reservoir. Preferably, the pH modification system comprises sufficient PAG to also lower the pH of the target reservoir sufficiently to result in a colour change. In embodiments where two colour changes are desired, the first initiator reservoir may comprise a sufficient quantity of PAG to cause a first pH drop and colour change in the target reservoir, and the second initiator reservoir may comprise sufficient quantity of PAG to cause a further pH drop and colour change in the target reservoir. The exact amount of PAG to add will depend on a number of factors, such as the size of the accumulator reservoirs and the target reservoir, but a sufficient quantity is the amount required to result in the desired pH drop and associated colour change, and this amount can be determined routinely.

The pH modification system may comprise a photosensitiser. A photosensitiser is a molecule which produces a chemical change in another molecule in a photochemical process. Photosensitisers generally work by absorbing light in the UV or visible region and transferring it to another molecule. Any suitable photosensitiser may be used. In one embodiment, perylene may be used as the photosensitiser. Perylene sensitises the photolysis reaction of the PAG as a result of its absorption and emission characteristics. Perylene is able to shift the frequency of incident light to a wavelength which PAGs, such as tri-aryl sulphonium salts, absorb more strongly. There may be one or more photosensitisers in the pH modification system.

The photosensitiser may be incorporated at any suitable concentration which allows photosensitiser to shift the frequency of light to a frequency which is more readily absorbed by the PAG. In the case of perylene, this may be added in an amount of from around 0.1 wt % to around 5 wt %. Preferably, the perylene is added in an amount of around 1 wt %. The amount of photosensitiser is given as a percentage of the weight dissolved in the associated solvent.

Preferably said initiator reservoir is (at least partially) filled with a hydrogel polymer or other high viscosity medium.

Preferably said acid generation system is entrained either within a matrix formed by said hydrogel polymer or within said high viscosity medium.

In an embodiment, the initiator reservoir does not comprise a hydrogel polymer or other high viscosity medium. The initiator reservoir may contain the PAG, a solvent, and optionally, a photosensitiser.

In an embodiment, the label also comprises an accumulator reservoir. Preferably, the initiator, accumulator, and target reservoirs are arranged in series. The reservoirs may be arranged in the order initiator to accumulator to target reservoir.

The reservoirs may be separated by stimuli-responsive hydrogel polymer plug(s).

The accumulator reservoir may comprise a high viscosity medium.

The high viscosity medium may comprise any suitable medium to bestow the desired physical and/or chemical characteristics in order to control the passage of hydrogen ions along the accumulator reservoir.

It is preferred that the rate at which the viscosity of the high viscosity medium varies with temperature is related to the rate at which the decay of the perishable item to which the label is applied varies with temperature. In this way, the label of the present invention operates correctly and provides the appropriate time indication regardless of whether or not the perishable item is stored in accordance with the manufacturer's directions. For example, if the item, once opened, is intended to be refrigerated and stored at around 5° C., but the consumer mistakenly stores the item at ambient temperature, for example in a cupboard, then it is important that the label of the present invention can take account of the error and still function correctly. Assuming that storing the item at elevated temperatures increases the rate of decay of the item, the time periods for the colour changes to occur must also be shortened by the appropriate amount to provide the consumer with correct information. This may be achieved by appropriate selection of the high viscosity media contained within the accumulator reservoir(s) such that the rate at which their viscosity varies with temperature is related to, or more preferably substantially matches, the rate at which the perishable item varies with temperature, and that the rate of diffusion of hydrogen ions through the high viscosity media is increased at increased temperatures to reflect or preferably substantially match the increased rate at which the perishable item degrades.

Said acid generation system may comprise an acid generator entrained within a pH sensitive hydrogel polymer, said combination of acid generator and pH sensitive hydrogel polymer becoming a fast acting photo-sensitive hydrogel polymer, such that, upon exposure to light said hydrogel polymer de-swells effecting release of said acid, or the passage of other acidic material.

In another embodiment, the acid generation system comprises a PAG, a solvent, and optionally a photosensitiser. The acid generation system is located adjacent a stimuli-responsive hydrogel polymer plug, such that, upon exposure to light, the stimuli-responsive hydrogel polymer de-swells effecting release of said acid, or the passage of other acidic material. In an embodiment, the stimuli-responsive hydrogel polymer plug is pH sensitive and de-swells when the pH drops to a predetermined level.

In another embodiment, the initiator reservoir comprises an acidic solution. The acidic solution in the initiator reservoir is located adjacent a stimuli-responsive hydrogel polymer plug, such that, on exposure to light, the stimuli-responsive hydrogel plug de-swells effecting release of said acidic solution or allowing the passage of other acidic material. The stimuli-responsive hydrogel polymer plug is preferably responsive to light.

Preferably, at least a portion of said initiator reservoir is arranged such that it can be exposed to light, more preferably said light exposure is achieved by the removal of a peelable light impermeable upper layer of said label.

Said target reservoir comprises at least a portion which is visible from outwith said label, thereby providing visual indicia for a user as to the current usability of the produce upon which said label is being used.

Preferably, said time temperature indicator label comprises an initiator reservoir, an accumulator reservoir and a target reservoir, said reservoirs being physically separated by stimuli-responsive hydrogel polymer plugs.

Preferably said stimuli-responsive hydrogel plugs are pH responsive hydrogel plugs.

Preferably said first hydrogel plug (separating said initiator and accumulator reservoirs) comprises a first hydrogel, and said second hydrogel plug (separating said accumulator and target reservoirs) comprises the same hydrogel.

Optionally said first hydrogel plug (separating said initiator and accumulator reservoirs) comprises a first hydrogel, and said second hydrogel plug (separating said accumulator and target reservoirs) comprises a second, different hydrogel.

Preferably said first and second hydrogels respond to different levels of the same stimulus.

Preferably said first and second hydrogels respond to different pH levels.

Optionally, said first and second hydrogels may be responsive to two entirely different stimuli.

Preferably said accumulator reservoir is filled with a further hydrogel polymer, or a high viscosity medium, to retard diffusion of hydrogen ions through said reservoir.

The use of accumulator reservoirs in the foregoing examples allows for the gradual build-up of hydrogen ions proximal the target reservoir, without the two being allowed to come into contact with each other until such time as the pH within the accumulator reservoir causes rapid de-swelling and collapse of the reactive plug, thus allowing for rapid pH change in the target reservoir, and therefore colour change, within said target reservoir.

In one embodiment of the present invention, upon activation of said label, the acid generation system generates an acid which causes the pH in the initiator reservoir to drop, the reduced pH in the initiator reservoir causes said first hydrogel plug to de-swell, thereby providing a fluid connection between said initiator reservoir and said accumulator reservoir. Upon de-swelling of said first hydrogel plug, hydrogen ions begin to diffuse from said initiator reservoir into said accumulator reservoir, the rate of said diffusion being dependent upon both the relative pH of the two reservoirs, physical size of the reservoirs, the size (cross sectional area) of the entrance gate, and the viscosity of the gel or hydrogel or high viscosity medium (which is itself temperature dependent), over time the pH of the accumulator reservoir drops to such a level that the reduced pH in the accumulator reservoir causes said second hydrogel plug to de-swell, thereby providing a fluid connection between said accumulator reservoir and said target reservoir, providing a massive and proximal supply of low pH to initiate a rapid colour change reaction. Upon de-swelling of said second hydrogel plug, hydrogen ions begin to rapidly diffuse from said accumulator reservoir into said target reservoir wherein they interact with said acid responsive indicator to effect a rapid colour change.

A second embodiment of the present invention differs from the first in that said label is provided with two initiator reservoirs, each connected to a separate accumulator reservoir, said connections each being blocked by separate, stimuli-responsive hydrogel plugs, said separate accumulator reservoirs each being connected, via a further two separate stimuli-responsive hydrogel plugs, to said target reservoir. In operation, said label is very similar to that discussed in said first embodiment; upon activation of said label, the acid generation systems in each accumulator reservoir generates an acid which causes the pH in said initiator reservoirs to drop, the reduced pH in the initiator reservoirs causes said first hydrogel plugs to de-swell, thereby providing a fluid connection between said initiator reservoirs and said accumulator reservoirs. Upon de-swelling of said first hydrogel plugs, hydrogen ions begin to diffuse from said initiator reservoirs into said accumulator reservoirs, over time the pH of the accumulator reservoirs drops to such a level that the reduced pH in the accumulator reservoirs causes said second hydrogel plugs to de-swell, thereby providing a fluid connection between said accumulator reservoirs and said target reservoir. Upon de-swelling of said second hydrogel plugs, hydrogen ions begin to diffuse from said accumulator reservoirs into said target reservoir wherein they interact with said acid responsive indicator to effect a colour change.

Preferably said label is arranged such that said first and second accumulator reservoirs cause the de-swelling of said plugs separating them from said target reservoir at disparate points in time, such that the contents of said first accumulator reservoir diffuse into said target reservoir earlier than the contents of said second accumulator reservoir, such that two distinct colour changes are effected.

Said time differentials discussed above may be achieved through the provision of different hydrogel polymer materials for the various plugs, and the variable parameters of the respective accumulator reservoirs.

Said time differentials discussed above may be achieved through the generation of different levels of acidity in said respective initiator reservoirs.

Said time differentials discussed above may be achieved through the provision of different hydrogel polymers or high viscosity media within said different accumulator reservoirs.

Said time differentials may be achieved through the physical parameters of the label's component parts, including, but not restricted to the relative sizes of the various reservoirs, the size of the connecting 'passages' between the various reservoirs or the geometry of said connecting passages.

Preferably said time differentials discussed above are achieved through a combination of the above stated factors.

Preferably said label is of a laminar construction, more preferably comprising a base layer, an intermediate layer and a top layer, preferably with a further, peelable strip preventing the inadvertent ingress of light to said initiator reservoir(s).

Preferably said base layer and top layer are unitary, unbroken polymer films.

Preferably said reservoirs are formed by die-cutting and removal of portions of said intermediate layer.

Optionally, said reservoirs are formed via the deposition of materials onto a base layer in a 3D printing set up.

Optionally said reservoirs are formed via screen printing of UV curable materials onto a base layer.

Preferably said target reservoir contains one or more pH reactive inks arranged to enhance the colour change of said acid responsive indicator. Alternatively, said acid responsive indicator may comprise said one or more pH reactive inks.

Preferably, said pH reactive materials are entrapped within a polymer matrix contained within said target reservoir.

Preferably said polymer matrix comprises an aqueous (non re-solublising ink) or a UV cured polymer ink.

Preferably said stimuli responsive hydrogel polymers are selected from the group comprising poly (vinyl alcohol)/poly (acrylic acid) [PVA/PAA]; poly (methacrylic acid) [PMAA] and 2-(dimethylamino) ethylmethacrylate/N-vinyl pyrrolidone [DNAEMA/NVP].

According to a second aspect of the present invention, there is provided a time-temperature indicator label comprising first and second reservoirs separated by a hydrogel valve, said valve allowing passage of an acid from said first reservoir to said second reservoir when the hydrogel valve is activated.

The invention according to the second aspect of the present invention may incorporate any of the features described above in connection with the first aspect of the present invention. Similarly, the invention according to the first aspect of the present invention may incorporate any of the features described in connection with the second aspect of the present invention.

In an embodiment, the hydrogel valve may be activated by exposure to light, heat, enzymatic action, magnetism, electricity, as well as changes to pH, ionic strength, temperature, and the like. In one embodiment, the hydrogel valve is activated by change in pH. In another embodiment, the hydrogel valve is activated by exposure to light. By activated, it is understood that this means that the valve undergoes a physical change which opens the valve. The physical change may be a shrinkage or de-swelling of the hydrogel valve.

In an embodiment according to the second aspect of the present invention, having a hydrogel valve or plug which is activated by exposure to light obviates the need for a PAG in the initiator reservoir. Therefore, in an embodiment, the initiator reservoir may comprise an acid source. The acid source preferably does not require photoinitiation. The acid source may comprise any suitable acid. For example, the acid source may comprise a weak or a strong acid. The acid source may comprise natural food acids, such as ethanoic or ascorbic acid. The acid source may be a mineral acid, such as hydrochloric acid.

The invention according to the second aspect of the present invention functions is a similar way to the invention according to the first aspect of the present invention. The difference is that the label according to the first aspect of the present invention is activated by the initiator reservoir being exposed to light, which causes acid to be generated in the initiator, which results in de-swelling of a hydrogel plug, whereas the label according to the second aspect of the present invention is activated by the hydrogel plug being exposed to light, which causes the plug to de-swell and allow acid contained within the initiator reservoir to pass into the following reservoir. In either aspect, once the first hydrogel plus has de-swelled and allowed hydrogen ions to pass into the following reservoir, the labels according to the first and second aspects function in the same way. As such, it will be appreciated that any of the features described in respect of either the first or second aspect of the present invention may be incorporated into the other of the first or second aspects of the present invention, and that all such possible combinations are expressly considered and disclosed.

In pH reactive hydrogels, the pendant acidic or basic groups on polyelectrolytes undergo ionisation. Since the acidic or basic groups are attached to a polymer backbone, the ionisation of such groups can result in swelling of the hydrogel polymers which is much greater than that which can be achieved using non-electrolytic polymer hydrogels. The swelling of the polyelectrolyte hydrogels is mainly due to the electrostatic repulsion between charges present on the polymer chain, and the extent of swelling is therefore influenced by any condition that reduces electrostatic repulsion, such as pH. In this way, changes in the pH in a region near to the hydrogel valves can result in changes in the ionisation of the hydrogel polymer and result in a de-swelling of the hydrogel valve. The addition or removal of protons from the hydrogel alters the distribution of charge in the polymeric structure, which alters the electrostatic forces within the polymer and thus alters the shape of the polymer.

Exemplary pH reactive hydrogels include polymers of carboxyethyl acrylate (BCEA) using a polyethylene diacrylate (PEGDA) cross-linking agent. Other exemplary hydrogels comprise polymers of acrylic acid using N,N'-methylenebisacrylamide (MBA) as the cross-linking agent. Analogous hydrogels can be used using sodium acrylate instead of acrylic acid.

The extent of swelling or deswelling of a hydrogel polymer can be expressed as a Q value. A Q value of greater than one indicates a swelling of the hydrogel, and a Q value of less than 1 indicates a deswelling or shrinkage of the hydrogel. Measuring the Q value of any given hydrogel can be carried out routinely. The volume of the hydrogel is measured prior to a change in pH and then measured again once the pH has been changed. In the present case, the ratio of the volume of the hydrogel at a lower pH to the volume of the hydrogel at a higher pH is the Q value.

Since the invention according to the first and second aspects of the present invention relies on shrinkage or de-swelling of the hydrogel plug at lower pH levels, the Q value of the hydrogels is less than 1 at decreased pH levels.

The hydrogel valve according to the second aspect of the present invention may comprise a photo-reactive hydrogel. A photo-reactive hydrogel changes its shape, either by swelling or deswelling, on exposure to light. Examples of photo-reactive hydrogels include azobenzenes and spiropyrans.

Azobenzene groups can undergo an isomerization from a trans form to a cis from upon UV irradiation. The distance between the para carbon atoms in the cis form is much less than the distance between the para carbon atoms in the trans form. In this way, a polymer incorporating azobenzene groups in the backbone can shrink when exposed to UV light.

Spiropyran is a photo-chromic group which undergoes a heterocyclic ring cleavage at the C—O spiro bond to form a planar ad highly conjugated chromophore that absorbs strongly in the visible region, namely the merocyanine isomer. The open-ring form may return to the initial closed-ring form either by a thermal or photochemical process. Spiropyran derivatives can be entrapped, cross-linked, and introduced as side chains or parts of the main chain in polymer matrices. In an acidic environment, the isomerization equilibrium is driven to the right hand side, with the merocyanine isomer predominating. Upon exposure to visible light, the equilibrium is shifted to the left and the spiropyran isomer predominates.

The equilibrium between the spiropyran and merocyanine is:

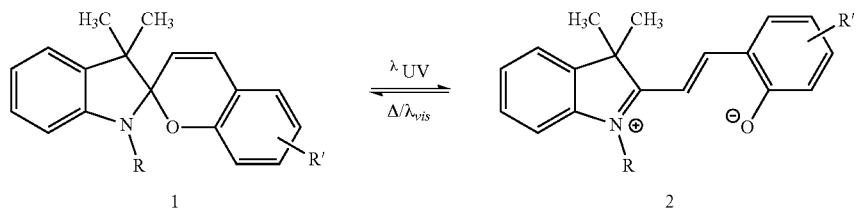

N-isopropylacrylamide (NIPAAm) has been used as a base material for stimuli responsive hydrogels due to its high degree of swelling at low temperatures and the large volume changes it exhibits. Photoresponsive hydrogels can be formed by functionalising poly(N-isopropylacrylamide) gels (p(NIPAAm)) with spirobenzopyran chromophores (SP). Functionalising the p(NIPAAm) gels with SP produces hybrid materials, and the photoresponsive spiropyran molecule is able to open to the charged merocyanine under UV irradiation and revert to the uncharged spiropyran isomer under white light irradiation.

A polymer formed from 2 wt % N,N'-methylenebisacrylamide, 5 wt % acrylic acid, 91 wt % N-isopropylacrylamide, 1 wt % Irgacure 819 (Bis(2,4,6-trimethylbenzoyl)-phenylphosphineoxide), and 1 wt % spiropyran has the spiropyran groups in the merocyanine isomeric form. Upon exposure to white light, the spiropyran form is preferred and the hydrogel will shrink.

The degree of shrinkage depends on the spiropyran used. Spiropyran has the general formula:

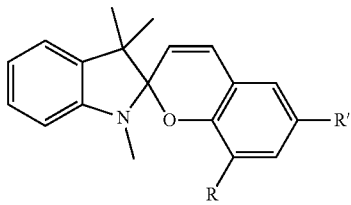

The three different spiropyrans used has the structures:

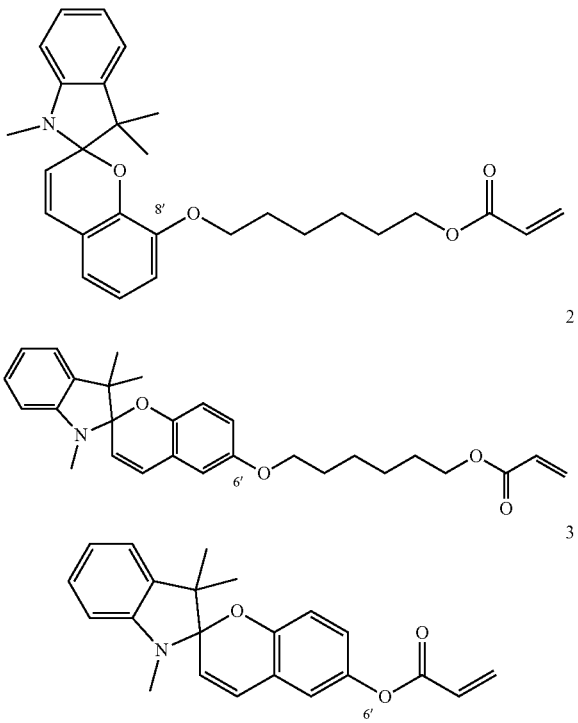

The hydrogels comprising spiropyrans 1, 2, or 3 shrank to 65%, 58% and 54% of their original size, respectively, on exposure to white light. When the illumination is removed, the hydrogels begin to re-swell as the merocyanine form begins to predominate. The hydrogel incorporating spiropyran 1 reswells almost completely, and with spiropyrans 2 or 3, these re-swell to approximately 75% of the initial size.

The hydrogel valve may comprise photo-responsive ionogels. Ionogels differ from standard hydrogels due to the inclusion of an ionic liquid within the hydrogel matrix.

Ionogels comprising three monomeric units: poly(N-isopropylacrylamide)—p(NIPAAm), N,N-methylene-bis(acrylamide)—MBAAm, and the protonated form of 1', 3', 3'-trimethyl-6-hydroxyspiro(2H-1-benzopyran-2,2'-indoline (MC—H+) (in a 100:5:1 ratio) have been shown to act as suitable hydrogel bases for the inclusion of ionic liquids, said resulting ionogels, when also comprising 2,2-dimethoxy-2-phenyl acetophenone DMPA (in the same mol ratio as the indoline, to act as a photoinitiator) exhibit photo-initiated shrinkage/dehydration.

The photo-initiated shrinkage of ionogels comprising polymeric gels of the above formulation with the addition of various ionic liquids has been characterised in Benito-Lopez et al. Lab Chip, 2010, 10, 195-201.

The ionic liquids used were: Trihexyltetradecyl-phosphonium dicyanoamide [P6,6,6,14] [dca]$^-$, trihexyltetradecylphosphonium bis(trifluoromethanesulfonyl)-amide [$P_{6,6,6,14}$] [NTf2]$^-$, trihexyltetradecyl-phosphonium dodecylbenzenesulfonate[$P_{6,6,6,14}$][dbsa]$^-$, and triisobutyl (methyl)-phosphonium tosylate [$P_{1,4,4,4}$] [tos]$^-$ It was found that changing the IL incorporated into the ionogel has a dramatic effect on the rate and amount of shrinkage upon exposure to white light. In particular, the opening speed of microvalves constructed from the above ionogels is shown in Table 1 below. In each case the ionogel was polymerised in situ via exposure to a 365 nm UV light source. It can be seen that it is possible to produce microvalves from hydrogels and that the rate at which the hydrogel microvalves open can be controlled by addition of ionic liquids.

TABLE 1

| Ionic Liquid | None | [dca]$^-$ | [NTf2]$^-$ | [dbsa]$^-$ | [tos]$^-$ |
|---|---|---|---|---|---|
| t, s | 2 | 4 | 49 | 44 | 18 |

It should be evident to the educated reader that were one to substitute the acid generator for a light activated source of hydroxide ions then a similar effect could be achieved using bases as is delivered in the above examples through use of an acid. This possibility/eventuality has been envisaged by the present inventors and is thus incorporated herein.

The various aspects of the inventions according to the first and second aspects of the present invention can be altered to control the rate at which the hydrogen ions pass along the accumulator reservoir. The aspects include, but are not limited to the viscosity of the high viscosity medium in the accumulator reservoir, the dimensions of the accumulator reservoir, and the shape of the accumulator reservoir. In addition, the predetermined pH at which the hydrogel plugs de-swell can also be altered to control the timing mechanism of the label. The use of hydrogel plugs to de-swell and act as valves to allow a rapid influx of hydrogen ions into the target reservoir results in a rapid colour change so that the consumer does not have to make a subjective assessment of fitness for use. The ability to include multiple colour changes in a single label allows the label to be able to provide a consumer with additional information compared to labels of the prior art, which either do not have a clear and rapid colour change, or rely on a single colour change.

Embodiments of the invention will now be described by way of example and with reference to the accompanying schematic drawings wherein.

Figure 1:
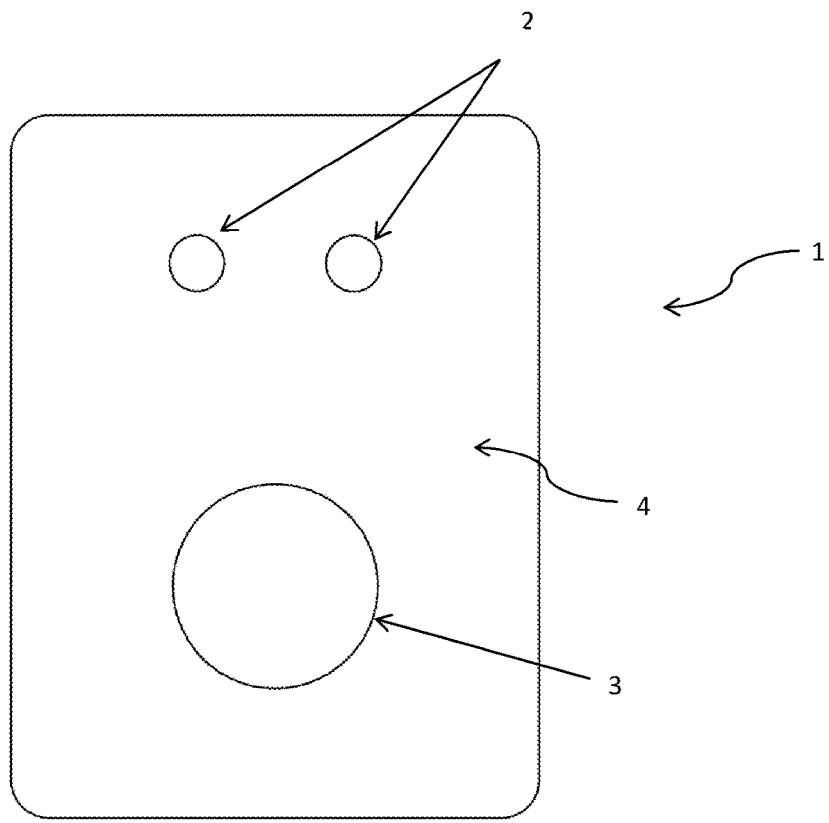
FIG. 1 is a schematic plan view of a label in accordance with the first and second aspects of the present invention.

FIG. 1 shows a schematic depiction of a time temperature integrating (TTi) indicator label 1 according to the first and second aspects of the present invention. The label 1 comprises transparent activation windows 2 and transparent viewing window 3. The transparent activation windows 2 overlie at least a portion of the photoinitiated pH modification system and/or the pH or light sensitive hydrogel plug. The transparent viewing window 3 allows the user to view the colour of the pH responsive indicator contained within the label 1. It will be appreciated that the activation windows 2 and the viewing window 3 may be of any suitable shape and size. It will also be appreciated that there may be any number of activation windows 2, including there being only a single activation window. Similarly, there may be any number of viewing windows 3. The activation window 2 and the viewing window 3 may overlap or be the same window.

Referring to FIG. 1, the label 1 is shown in plan form and the top layer 4 is shown as being blank. At least a portion of the top layer 4 is preferably transparent to allow light to activate the timing mechanism, namely the pH modification system and/or the pH or light sensitive hydrogel plug. However, it will be appreciated that portions of the top layer 4 may be opaque and/or the surface of the top layer 4 may be printed with decorations and/or information. The area of the top layer 4 above the photoinitiated hydrogel valve and/or photoinitiated pH modification system may not be entirely transparent, but is sufficiently transparent to allow sufficient light to pass through to activate the hydrogel valve and/or the pH modification system, and to allow the user to view the colour of the pH responsive indicator.

Figure 2:
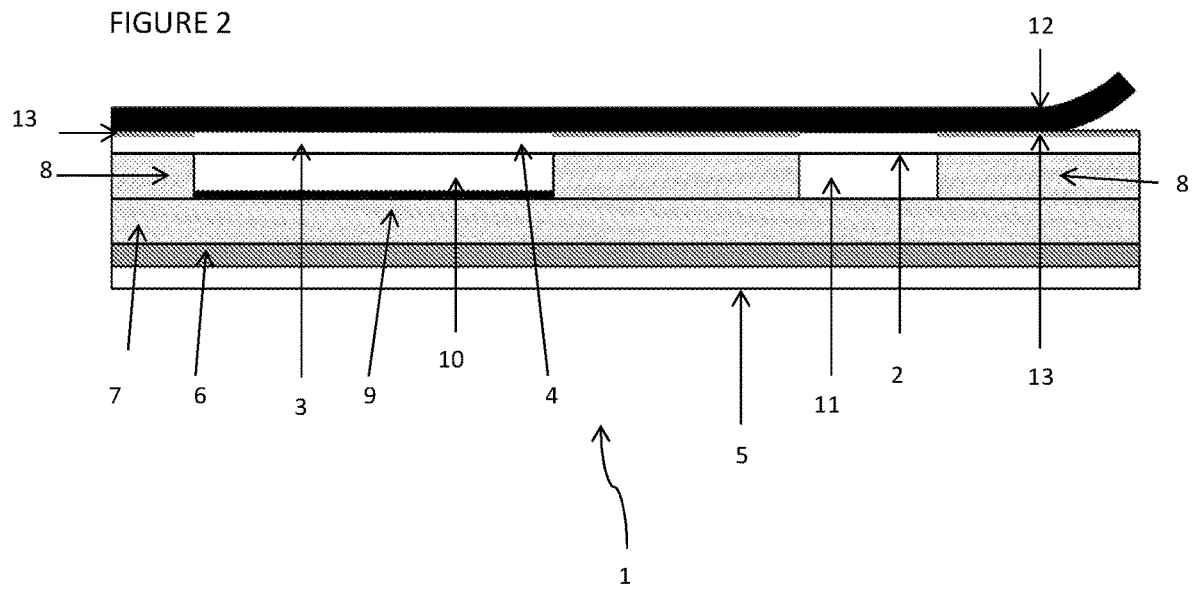
FIG. 2 is a schematic cross section of a label in accordance with the first aspect of the present invention.

FIG. 2 is a cross sectional view of the structure of label 1 (not to scale). Label 1 comprises a release liner 5. The release liner 5 may be calendered paper, such as glassine, or a polymer film, such as a polyolefin film. The release liner 5 may comprise polyethylene terephthalate or any other suitable polymer. The release liner 5 may be coated with silicone. Where the release liner 5 comprises calendered paper, it is preferably around 30 to around 80 microns thick, and where the release liner comprises a polymer film, it is preferably around 10 to 20 microns thick. However, it will be appreciated that where reference is made to the thickness of any particular layer, that the skilled person would recognise that any suitable thickness could be used. The release liner 5 allows the label to be transported and fed through the label applicator machinery, and is removed prior to the label application. The release liner 5 covers an adhesive layer 6. The adhesive 6 is preferably a pressure sensitive adhesive. The adhesive layer 6 allows the label 1 to be affixed to packaging. The adhesive layer 6 is attached to the base layer 7.

The base layer 7 is preferably a polymer film. The base layer 7 is preferably white to allow the colour of the pH responsive indicator to be seen clearly by the consumer, but any colour could be used which allows the consumer to readily determine the colour of the pH responsive indicator. Preferably, the base layer 7 is an uninterrupted film. The base layer 7 may comprise polypropylene. The base layer may be around 50 to around 120 microns thick. The base layer is preferably an uninterrupted film. A pH sensitive colour changing ink 9 is printed onto the base layer 7. The pH sensitive colour changing ink 9 changes colour in response to changes in pH and provides the visual indication to the consumer of the status of the product to which the label 1 is applied.

The label 1 also comprises a body layer 8. The body layer 8 is preferably laminated onto the base layer 7 and serves to define the reservoirs of the label 1. The body layer 8 includes cut-outs which create cavities which may be filled with hydrogels, PAGS, high viscosity media, and/or buffer solution, as appropriate. The body layer 8 may be die cut. The body layer 8 may be self-adhesive. The body layer 8 may comprise polypropylene. The body layer may be around 50 to around 120 microns thick.

A buffer solution may be located in viewing cavity/target reservoir 10. The buffer solution is preferably colourless and serves to maintain the pH sensitive colour changing ink 9 at a constant pH until the label 1 is activated. The buffer solution preferably does not strongly resist changes in pH.

A photoinitiated pH modification system and/or pH or temperature sensitive hydrogel plug is located in the activation cavity/initiator reservoir 11 and or between the initiator reservoir 11 and the accumulator reservoir 16 respectively. It will be appreciated that the base layer 7 and body layer 8 may be printed using 3D printing techniques or tactile printing processes such that no die cutting is required. 3D digital printing and high volume rotary screen deposition may be used to form the base layer 7 and body layer 8. As such, the base layer 7 and the body layer 8 may be unitary.

The label 1 also comprises a top layer 4. The top layer 4 is preferably a polymeric film. The top layer 4 may comprise polypropylene or any other suitable polymer. The top layer 4 may be around 50 to around 75 microns thick. Preferably, the top layer 4 is an uninterrupted film, meaning that it comprises no cuts, perforations, recesses, or similar. The top layer 4 is preferably laminated onto the upper surface of the body layer 8. The top layer 4 may be printed with a pattern or information 13. The top layer 4 is preferably transparent such that at least a portion of the transparent area of the top layer 4 overlies at least a portion of the viewing cavity/target reservoir 10 and the activation cavity/initiator reservoir 11. The label 1 optionally comprises a peel-off layer 12. The peel-off layer 12 is preferably substantially impermeable to light. The peel-off layer 12 is preferably a filmic material, and may comprise polypropylene or any other suitable polymer. The peel-off layer 12 may be a metallic film. The peel-off layer 12 may be a metallised clear polymer film, which may comprise non-metallised areas which allow the consumer to view the viewing window/target reservoir. The peel-off layer 12 may be around 50 to around 75 microns thick. The peel-off layer 12 is preferably uninterrupted. The peel-off layer 12 may comprise inherently light impermeable material, or may be printed with one or more layers of light impermeable ink. The peel-off layer 12 may be laminated onto the surface of the top layer 4. The peel-off layer 12 is readily removable from the top layer 4 to allow the label 1 to be activated.

Figure 3:
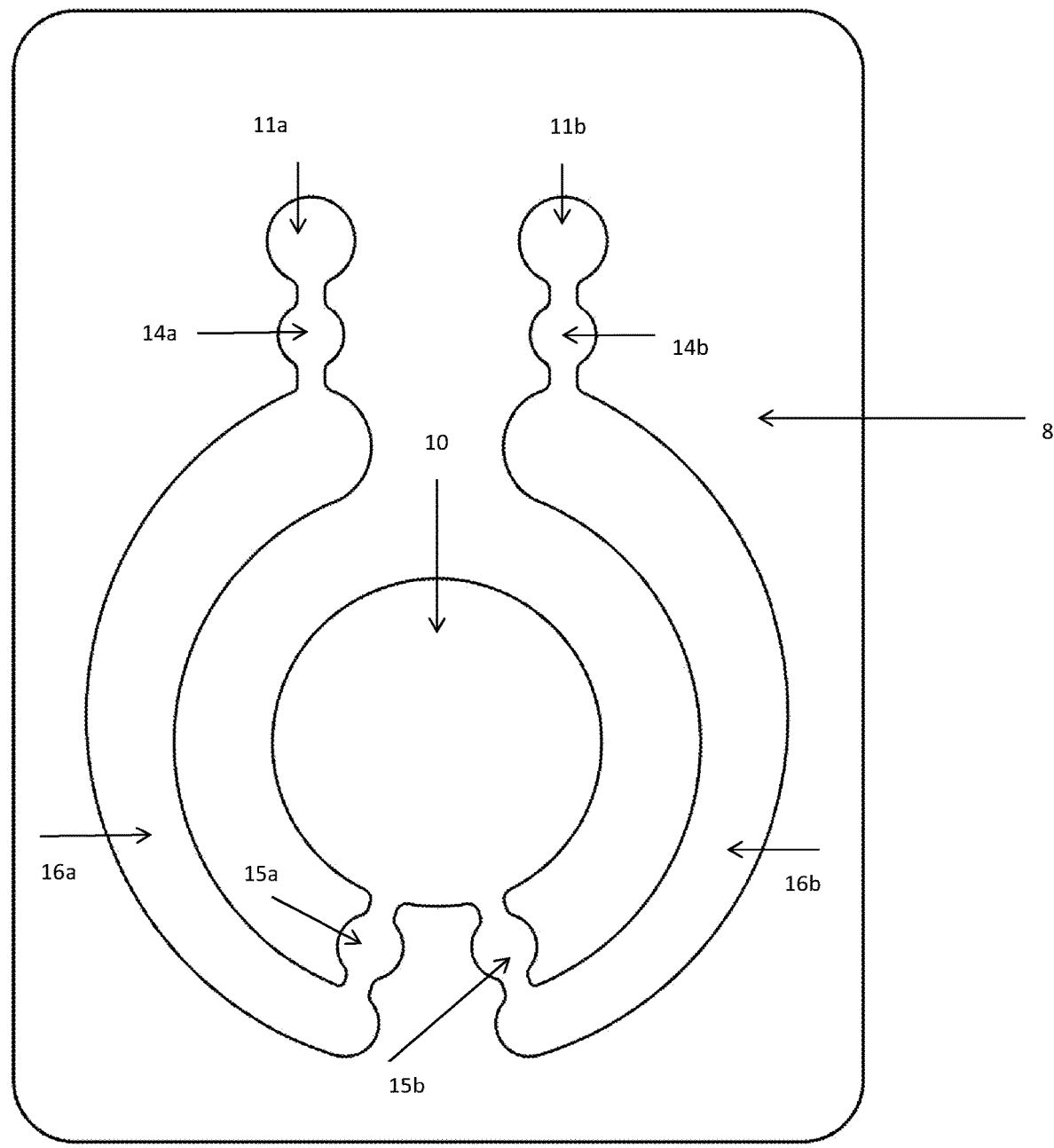
FIG. 3 is a schematic plan view of a body layer of a label in accordance with the first and second aspects of the present invention.

FIG. 3 is an exemplary plan view of the die cut areas of the body layer 8. The die cut areas form a continuous cavity. It will be appreciated that any suitable shape could be used and that the invention is not limited by the particular configuration shown. The viewing cavity/target reservoir 10 and activation cavity/initiator reservoir 11 are shown in plan view. The viewing cavity/target reservoir 10 and activation cavities/initiator reservoir 11 may be of any suitable shape. The activation cavity 11 defines the first/initiator reservoir and the viewing cavity 10 defines the second/target reservoir. Also shown are the areas in which hydrogel plugs or valves 14a, 14b, 15a, and 15b are located in the assembled label 1. The hydrogel plugs or valves 14a, 14b, 15a, and 15b create five discrete reservoirs or cavities in the label 1 which may be filled. In the present embodiment, the hydrogel plugs 14a, 14b, 15a, and 15b create two initiator reservoirs 11a, 11b, two accumulator reservoirs 16a, 16b, and a single target reservoir 10. It will be appreciated that other embodiments may have different numbers of such reservoirs. Accumulator reservoirs 16a and 16b are described in more detail in respect of FIG. 4. According to the first aspect of the present invention, the initiator reservoirs 11 comprise the pH modification system, which may comprise a PAG, solvent, and optionally a photosensitiser. In another embodiment, the initiator reservoir(s) 11 comprise an acidic solution which is allowed to pass into the accumulator reservoir(s) 16 when a photo-sensitive valve separating the initiator reservoir(s) 11 from the accumulator reservoir(s) is exposed to light.

Figure 4:
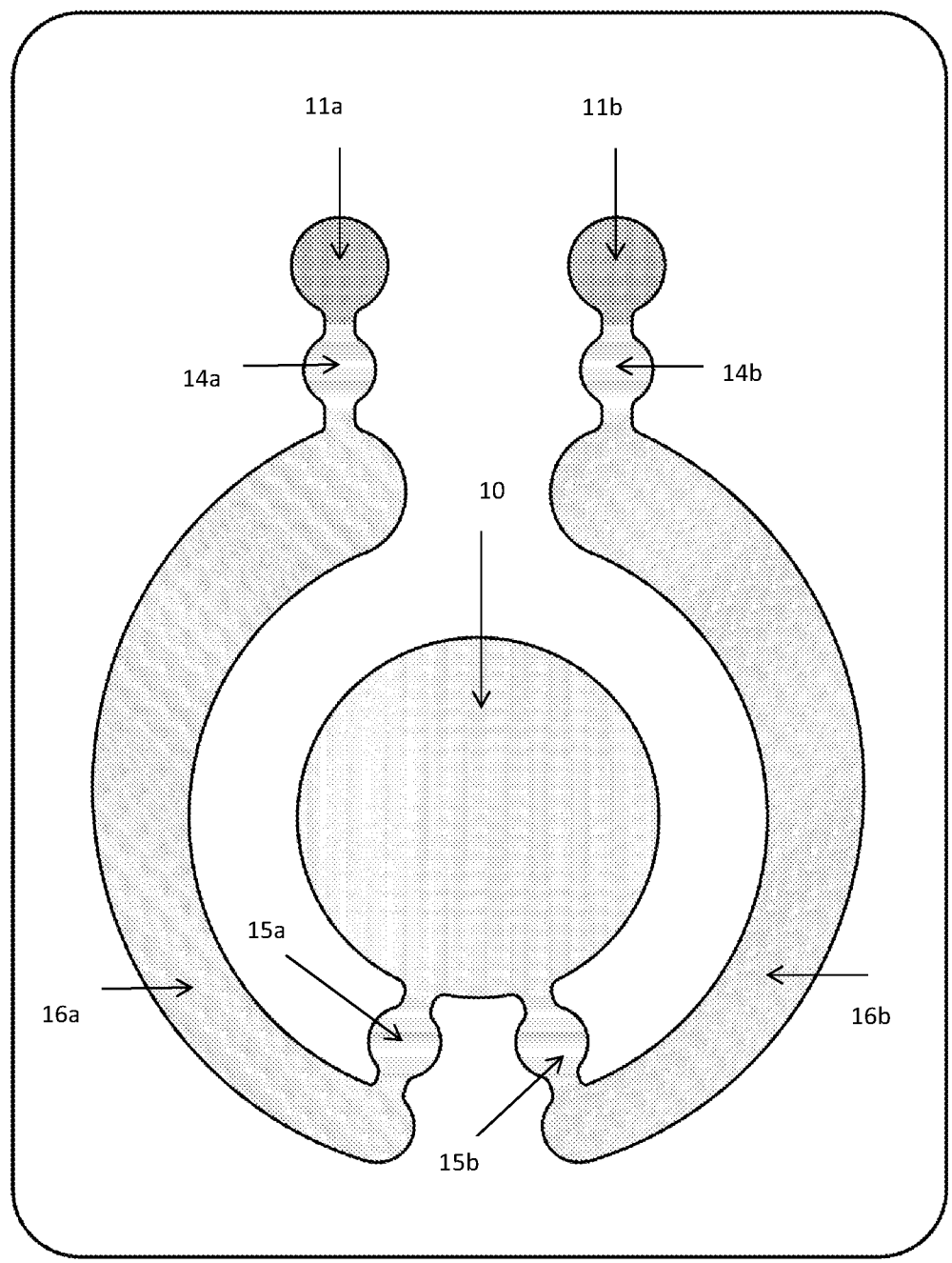
FIG. 4 is a schematic plan view of a label in accordance with the first aspect of present invention.

FIG. 4 shows a label 1 comprising a photoinitiated acid generation system in the initiator reservoir 11b. Adjacent to the photoinitiated acid generation system in the initiator reservoir 11b is a first hydrogel plug or valve 14b. The first hydrogel plug or valve 14b is pH sensitive and, prior to activation, serves as a separator between the acid generation system in the initiator reservoir 11b and the high viscosity medium in accumulator reservoir 16b. Once the PAG system in the initiator reservoir 11b has been activated, the first hydrogel plug or valve 14b de-swells or otherwise collapses to allow hydrogen ions to diffuse into the accumulator reservoir 16b. Contained within the accumulator reservoir 16b is a high viscosity medium which regulates the rate of diffusion of the hydrogen ions through the accumulator reservoir 16b. The rate of diffusion is controlled by the chemical composition, viscosity, and/or temperature of the high viscosity medium. Preferably the viscosity is in the range of from about 20 to about 7500 centipoise (at 20° C.). Preferably, the viscosity of the high viscosity medium in accumulator reservoir 16b is higher than that of the high viscosity medium in accumulator reservoir 16a. The pH of the high viscosity medium in accumulator reservoir 16b is preferably around 5.5 to around 7.0 prior to the activation of the label 1. The label 1 also comprises a second hydrogel plug or valve 15b. The second hydrogel plug or valve 15b separates the accumulator reservoir 16b from the target reservoir 10. Once the pH in the accumulator reservoir 16b drops of a predetermined level, the second hydrogel plug or valve 15b de-swells or otherwise collapses, thereby allowing hydrogen ions to pass into the target reservoir 10 and lower the pH. The drop in pH results in a visible colour change. The other side of the label 1 has a similar structure and similar features are given the same numbers, but with different letters. The other side of the label 1 operates in the same way, but the high viscosity medium in the accumulator reservoir 16a is different to that in accumulator reservoir 16b, which results in a different rate of diffusion of hydrogen ions along the reservoirs. Since the hydrogel plugs 15a and 15b are induced to de-swell at different times, this results in two colour changes at different times.

Figure 5:
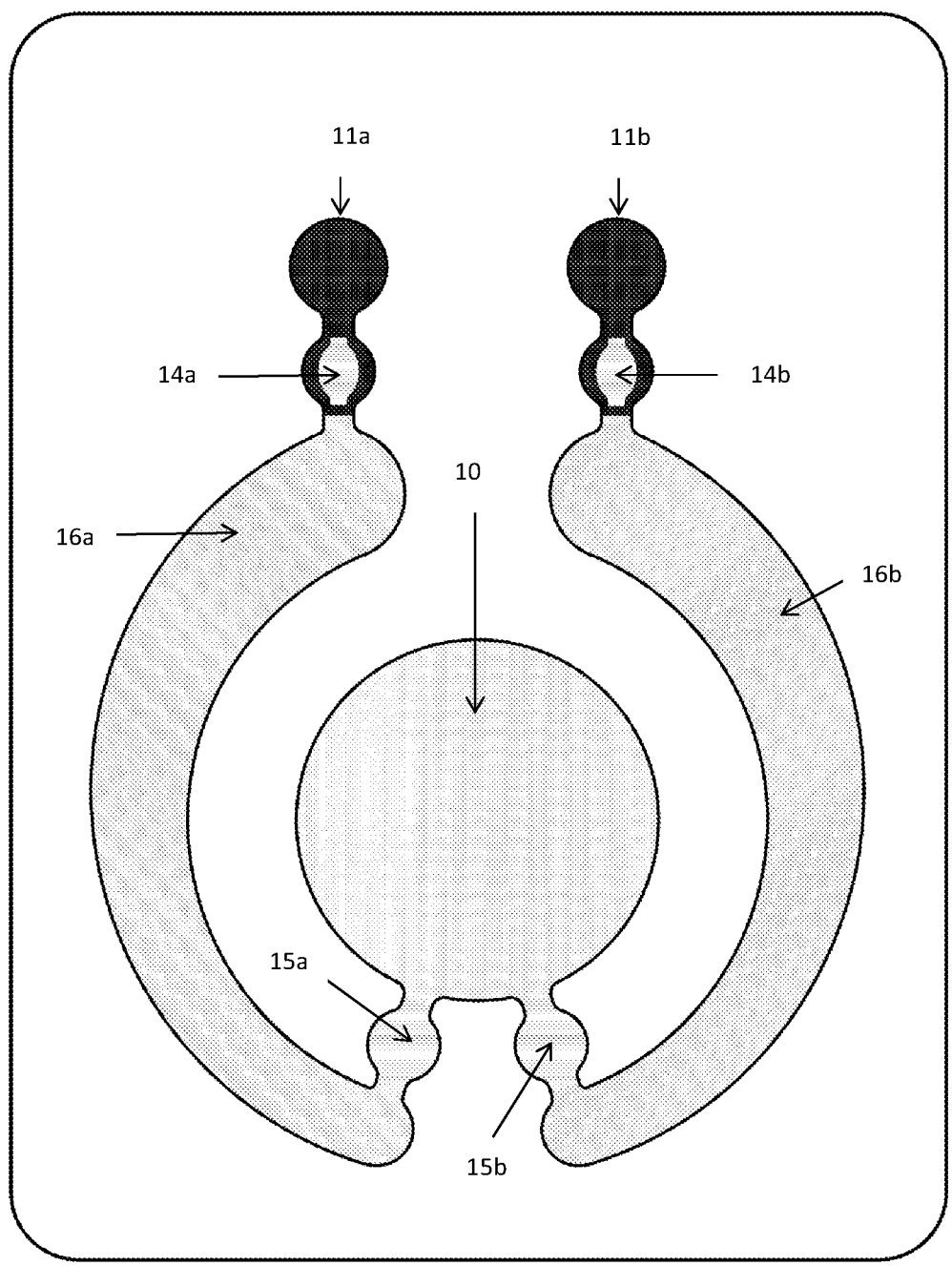
FIGS. 5 to 9 are schematic plan views of a label in accordance with the first aspect of present invention showing the timing mechanism in action from when the label is first activated through a first colour change and finally to a second colour change.

FIGS. 5 to 9 shows how the label 1 functions once it has been exposed to light. Exposing the PAG in the initiator reservoirs 11a, 11b to light causes the PAG to generate hydrogen ions, which lower the pH adjacent the hydrogel plugs 14a, 14b. The PAGs in the initiator reservoirs 11a, 11b may be the same or different. The PAGs may be included in the same or in different concentrations. In FIG. 5, the PAGs in the initiator reservoirs 11a, 11b have been activated by exposure to light and the decrease in pH caused by the generation of acidic species has caused the hydrogel plugs 14a, 14b to collapse. The collapse of the hydrogel plugs 14a, 14b results in them acting as a valve and allowing the hydrogen ions which have been generated by the PAG to pass into the respective accumulator reservoirs 16a, 16b. The PAGs can lower the pH to around 0 to around 2.0. The hydrogel plugs 14a, 14b may de-swell by around 40% at the predetermined pH.

Figure 6:
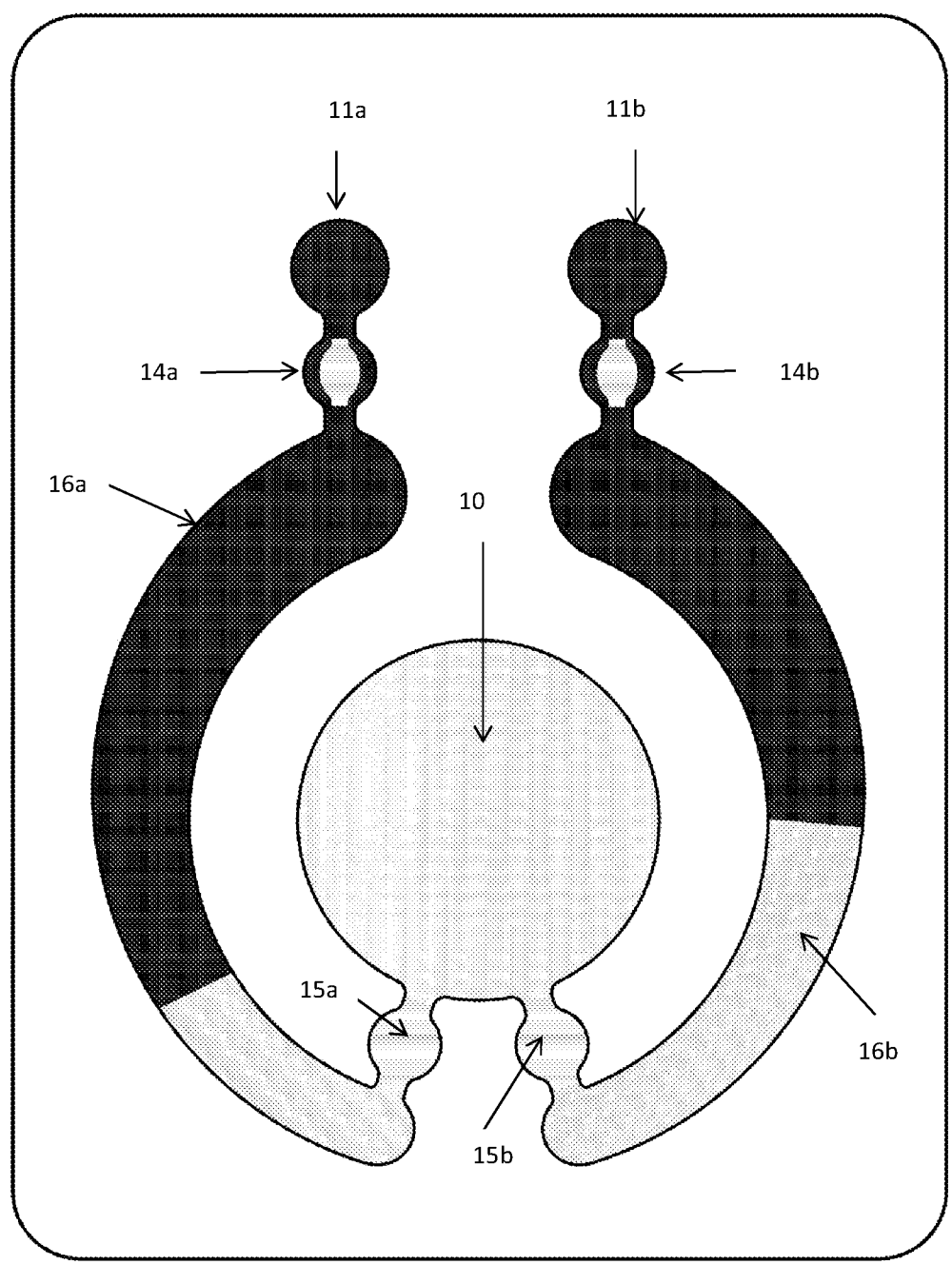

FIG. 6 shows the diffusion of the hydrogen ions through each of the accumulator reservoirs 16a, 16b. The hydrogen ions have diffused further along accumulator reservoir 16a compared to accumulator reservoir 16b. This is due to the different high viscosity media used in the reservoirs.

Figure 7:
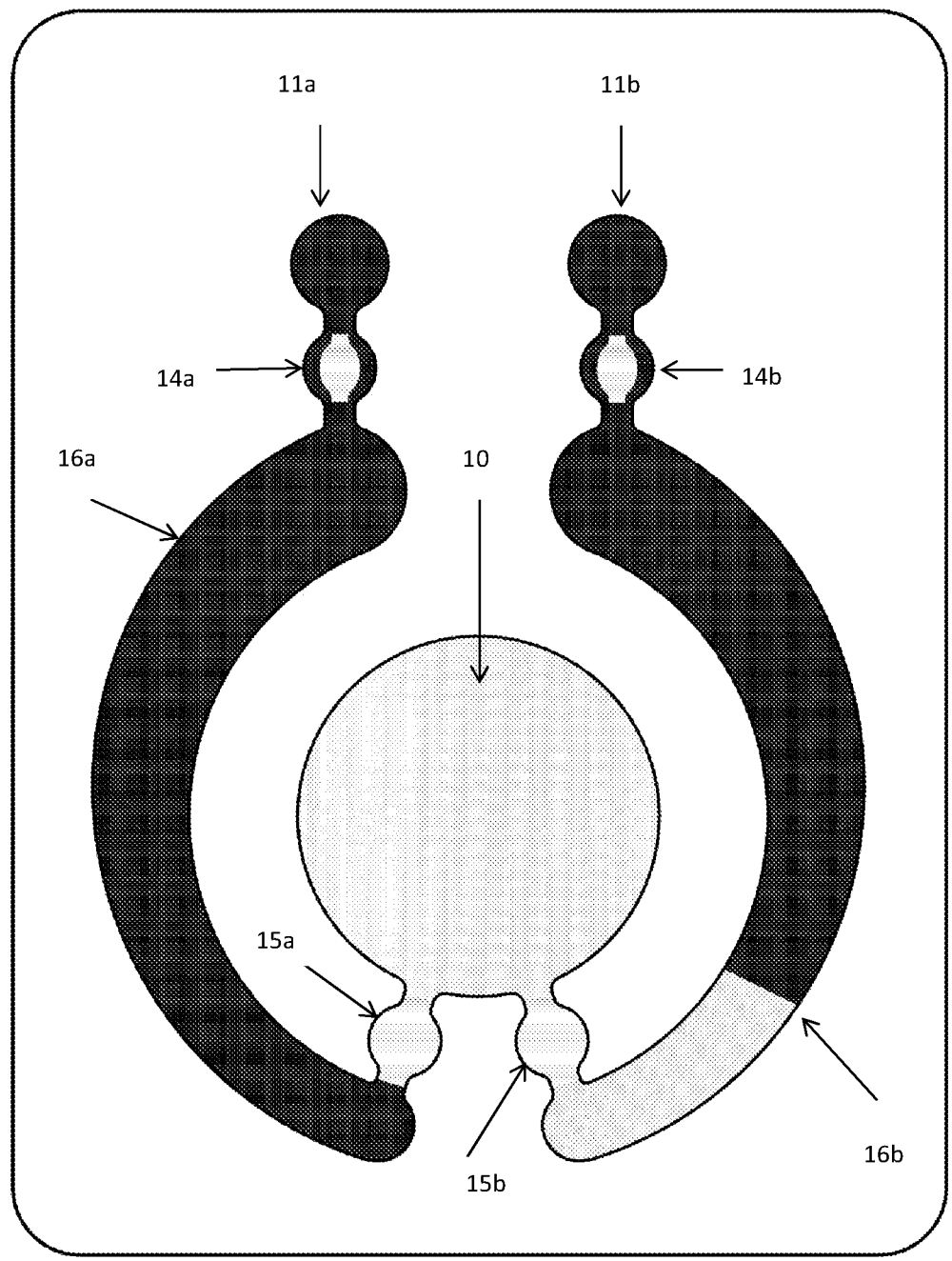

FIG. 7 shows the hydrogen ions having diffused along the accumulator reservoir 16a and reached hydrogel plug 15a. Hydrogel plug 15a is configured to deswell at a predetermined pH, such as around 4.5, and the concentration of ions in accumulator reservoir 16a continues to increase until the pH of the media adjacent the hydrogel plug 15a falls to the predetermined pH.

Figure 8:
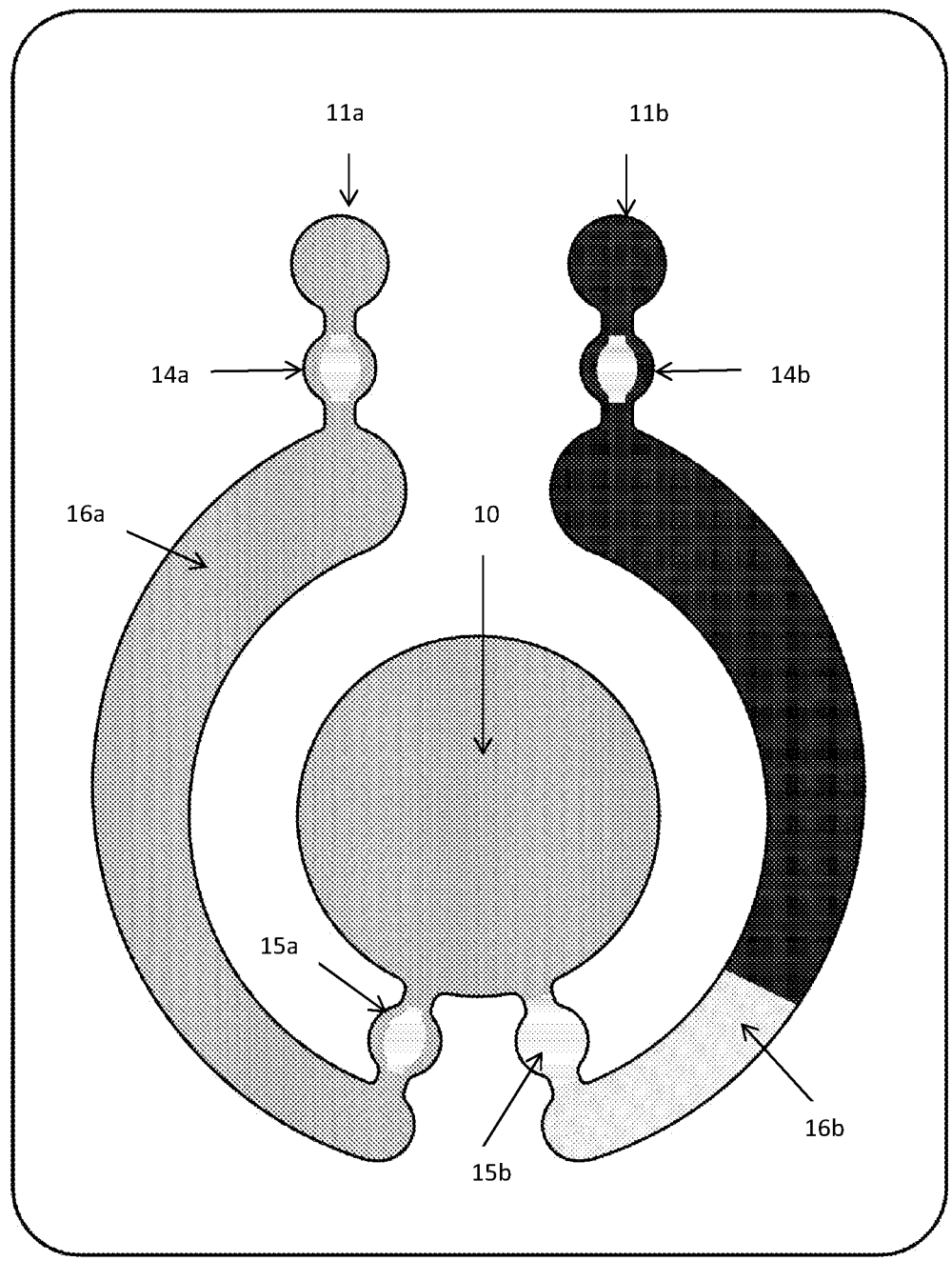

As shown in FIG. 8, once the pH adjacent the hydrogel plug 15a falls to the predetermined level, the hydrogel plug 15a de-swells and the hydrogen ions are able to rapidly pass into the target reservoir 10. The pH in the target reservoir 10 locally falls on account of the influx of hydrogen ions and this results in a colour change in the pH sensitive colour changing ink. The drop in pH in the target reservoir 10 is not sufficient to activate the second hydrogel plug 15b, which is configured to de-swell at a lower pH, such as, for example, around 2.5.

Figure 9:
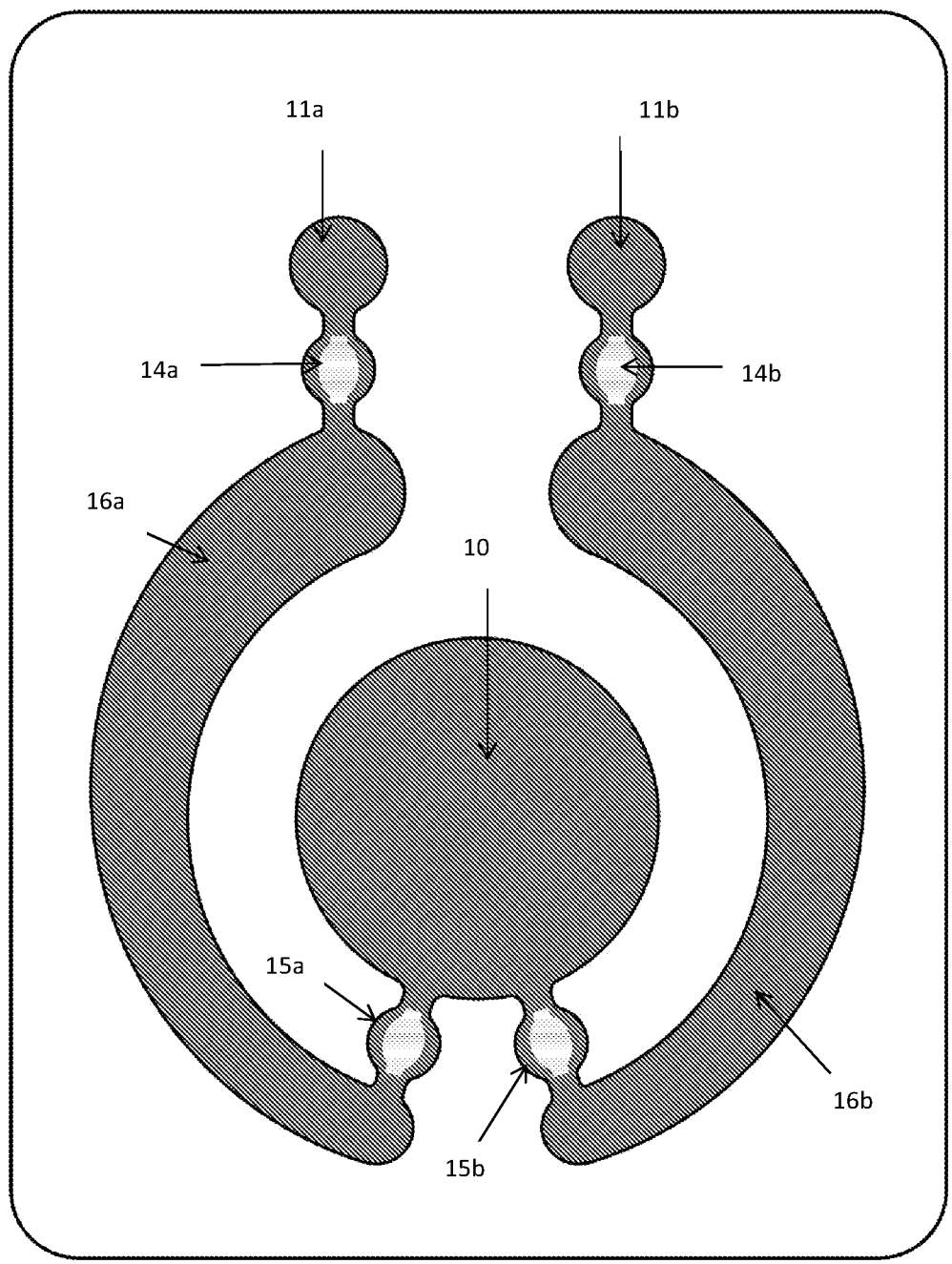

FIG. 9 shows the case where further time has passed and the hydrogen ions in the accumulator reservoir 16b have diffused towards hydrogel plug 15b and caused it to deswell. Since hydrogel plug 15b is configured to de-swell at a pH which is lower than the pH required to de-swell hydrogel plug 15a, when hydrogel plug 15b de-swells, the concentration of hydrogen ions which pass into the target reservoir 10 is greater and causes a further drop in pH in the target reservoir 10. This further drop on pH causes a second colour change in the pH sensitive colour changing ink. The second colour change may be from amber to red to indicate that the product is no longer suitable for use.

Figure 10A:
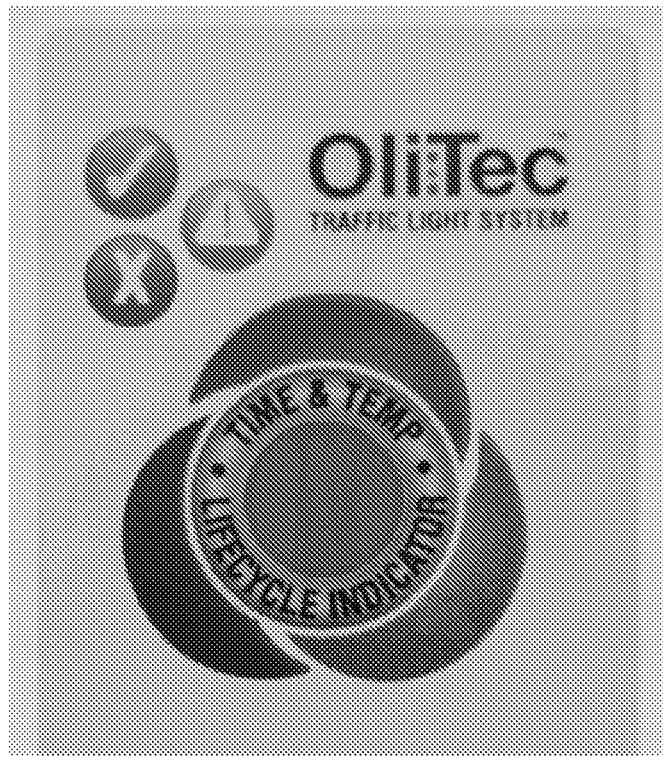
FIGS. 10a to 10d are photographs of an exemplary label in accordance with the first aspect of the present invention showing the progress of the timing mechanism.
Figure 10B:
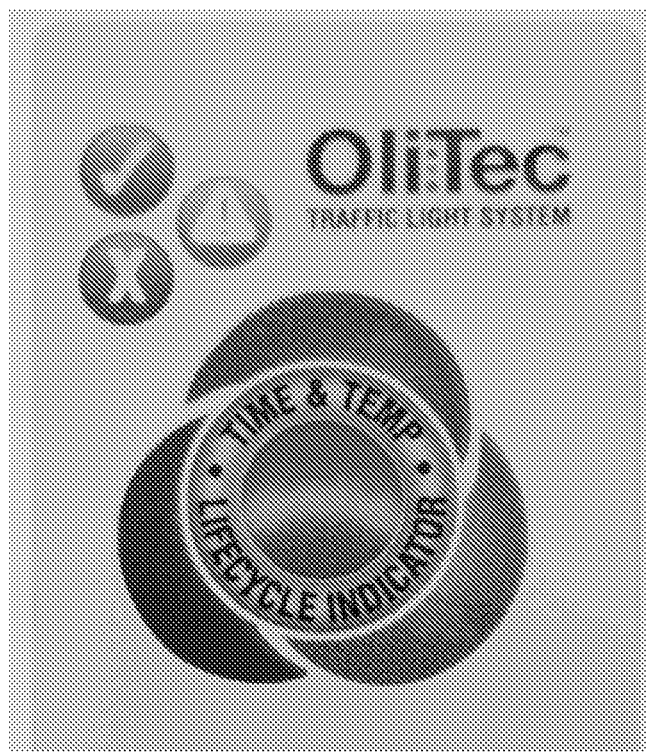
Figure 10C:
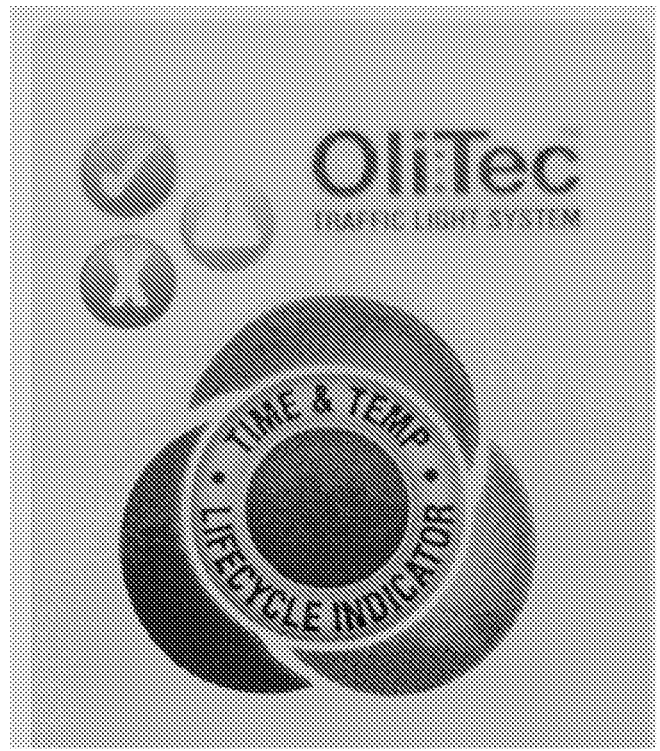
Figure 10D:
Figure 11:
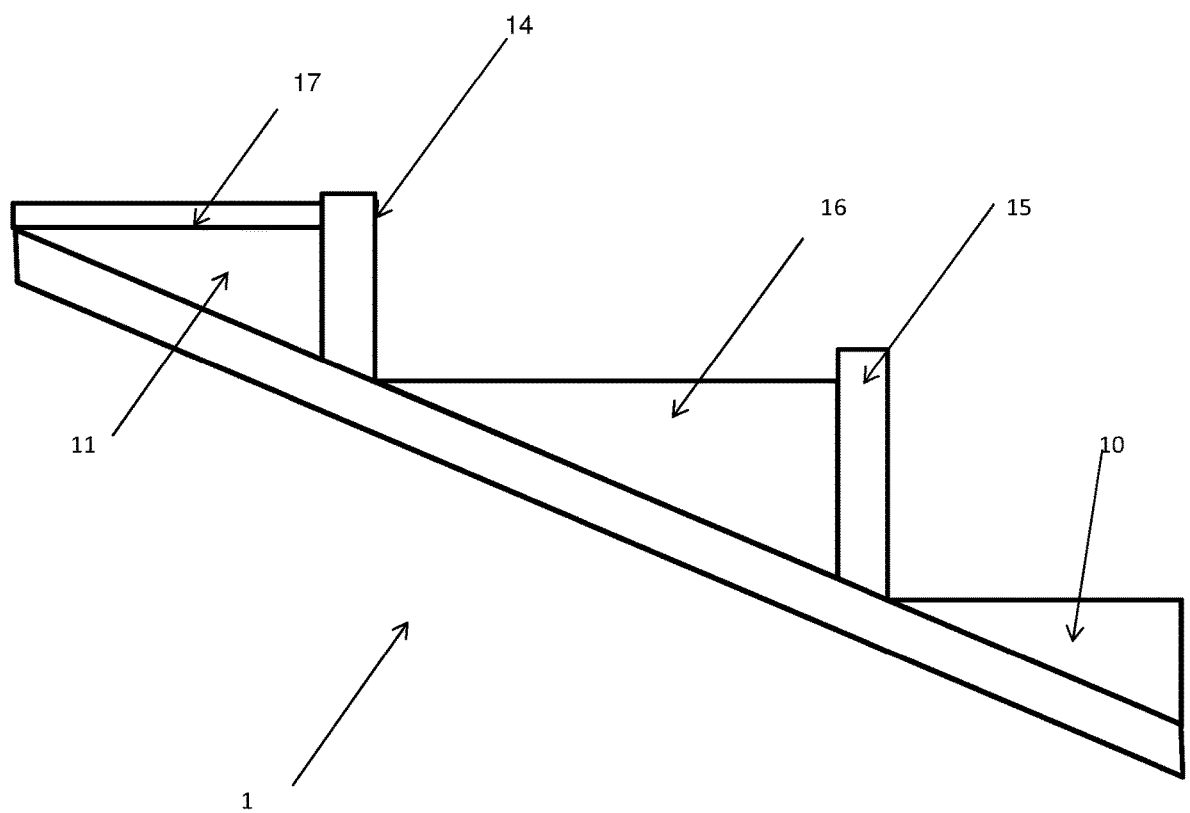
FIG. 11 is a schematic representation of a label in accordance with the first aspect of the present invention.

FIGS. 10a to 10d show the progress of the colour change of an exemplary label 1. FIG. 10a shows the label 1 prior to activation, and the remaining figures show the progress of the colour change as the hydrogel plugs 15a, and 15b de-swell and allow the pH in the target reservoir to drop. FIG. 10b shows a front of colour change originating from the lower portion of the central window and FIG. 10c shows the colour change extending almost to the top of the central window. FIG. 10d shows the completed colour change FIG. 11 shows a schematic representation of the functioning of the label according to the first aspect of the present invention. The label 1 comprises a first reservoir, also known as an initiator reservoir 11, comprising a pH modification system. In the illustrated embodiment, the pH modification system comprises a photo-acid generator 17. The PAG 17 is depicted as separate from the initiator reservoir 11, but this is for the sake of an example and it will be appreciated that the PAG 17 may be dispersed within the initiator reservoir 11 and does not have to be a separate layer. The label 1 further comprises a first hydrogel plug 14 which separates the initiator reservoir 11 from a second reservoir 16, which may be referred to as an accumulator reservoir. In addition, the label further comprises a second hydrogel plug 15 which separates the accumulator reservoir 16 from a third reservoir 10, which may be referred to as a target reservoir 10. It will be appreciated that certain embodiments do not comprise a separate accumulator reservoir 16. The target reservoir 10 comprises a pH responsive indicator which changes colour in response to changes in pH.

The label 1 may also comprise a light impermeable layer or barrier 12 to substantially block light from activating the photo acid generator 17. It will be appreciated that the light impermeable layer 12 is a removable feature of the label, which may be removed by the user or when the label is applied to a package.

In use, the light impermeable layer or barrier 12 is removed to expose the PAG 17 to light. On exposure to light, the PAG 17 generates hydrogen ions in the initiator reservoir 11. The increase in concentration of the hydrogen ions results in a drop in pH, for example from around 6.0 to around 4.5. When the pH in the initiator reservoir 11 drops to a predetermined level, the first hydrogel plug 14 de-swells to allow the hydrogen ions from the initiator reservoir 11 to pass into the second reservoir 16. Due to the increased concentration of hydrogen ions in the initiator reservoir 11 compared to the second reservoir 16, the hydrogen ions pass down the concentration gradient and into the second reservoir 16. As such, by altering the composition of the accumulator reservoir 16, it is possible to control the rate of diffusion of the hydrogen ions through the accumulator reservoir 16. The hydrogen ions are able to pass along the accumulator reservoir 16 until they reach the second hydrogel plug 15. The rate of diffusion of the hydrogen ions through the second plug 15 is very low or preferably substantially zero, which allows the concentration of hydrogen ions in the area adjacent the second plug 15 to increase, thereby lowering the pH. Once the pH has fallen to a predetermined level, for example around 4.5, the second plug 15 de-swells to allow the hydrogen ions from the accumulator reservoir 16 to pass into the target reservoir 10. The influx of hydrogen ions into the target reservoir 10 causes a drop in pH in the target reservoir 10. The pH responsive indicator in the target reservoir 10 changes colour in response to the drop in pH. The colour of the target reservoir 10 is visible to the user and the change in colour in the target reservoir 10 provides a visual indication that the label 1 has been activated for a first predetermined period of time. Preferably, the colour changes from green to orange or amber. Having the concentration of hydrogen ions accumulate near to the target reservoir 10 and then having the second hydrogel plug 15 collapse at a predetermined pH results in a rapid influx of hydrogen ions into the target reservoir 10 and a rapid change in colour. In the event that there was no plug or barrier between the accumulator reservoir 16 and the target reservoir 10, the change in pH of the target reservoir 10 would be more gradual and would drop slowly as the hydrogen ions diffused through the accumulator reservoir 16. This would lead to a gradual change in the colour of the target reservoir 10 and the user would have a much less clearly defined indication of the passage of time. In this way, it will be appreciated that the sequential collapse of the hydrogel plugs allows for the accumulation of hydrogen ions such that when the hydrogel plugs de-swell, there is a large concentration gradient of hydrogen ions from one side of the plug to the other, so that there is rapid diffusion of hydrogen ions into the next reservoir. The rate of diffusion of the hydrogen ions is controlled by the composition of the accumulator reservoir 16. The accumulator reservoir 1 may contain a high viscosity medium, such as a composition comprising, in any combination, one or more of carboxymethyl cellulose, hydroxyethyl cellulose, carbopol, and/or surfynol 465 in water.

The label 1 may comprise one or more initiator reservoirs and/or one or more accumulator reservoirs. Where there is more than one accumulator reservoir, the properties of one of the accumulator reservoirs may be altered to make the rate of diffusion along the reservoir slower. This may be achieved in any suitable way, such as, for example, increasing the length of the accumulator reservoir, altering the cross sectional area of the accumulator reservoir, providing a choke in the accumulator reservoir, or altering the material or materials contained within the accumulator reservoir. Having two accumulator reservoirs allows there to be two influxes of hydrogen ions into the target reservoir and two separate rapid drops in pH. This allows there to be more than one colour change in the reservoir. The second colour change may be from orange or amber to red. The second colour change may indicate that the product to which the label is applied is no longer fit for consumption. Thus, the time period for the first colour change to occur is dependent on the rate at which hydrogen ions are able to pass along a first accumulator reservoir, and the time period for the second colour change is dependent on the rate at which the hydrogen ions are able to pass along a second accumulator reservoir. In other embodiments, the hydrogen ions may pass along the two accumulator reservoirs at the same rate, but one reservoir may be longer than the other.

EXAMPLES

Photoinitiated Acid Generators

Examples of the photoinitiated pH modification system have been fabricated and tested. The results of the tests demonstrate the suitability of photo acid generators to generate hydrogen ions following exposure to light and thereby alter the pH of a system.

Example 1

A 50% w/w solution of the triarylsulphonium salts

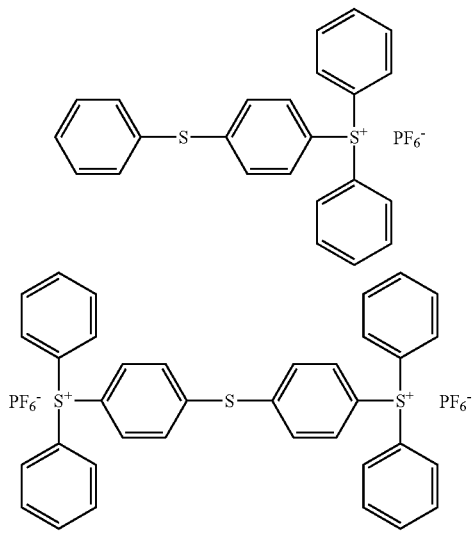

in propylene carbonate was prepared an exposed to light to generate acid. The solution comprised 1% by weight perylene. The solution was then brought into contact with an aqueous based, high viscosity medium (HVMT) comprising an admixture of carboxymethyl cellulose and carbopol and the pH of the HVMT was measured over time to track the migration of the hydrogen ions through the HVMT from the PAG solution.

In the first experiment 3:1 PAG:HVMT (w %/w %) was used. The solution was exposed to light for 24 hours. The pH of the HVMT began at 5.9 and after one hour in contact with the PAG solution, the pH had fallen to 4.0. At 24 hours, the pH had fallen to 2.3, and the pH ultimately fell to 1.8 after six days.

In a second experiment 6:1 PAG:HVMT (w %/w %) was used. The solution was exposed to light for 144 hours. The pH of the HVMT began at 5.3 and had fallen to 2.1 after 24 hours in contact with the PAG solution. The pH ultimately fell to 1.8 after 2 days.

Example 2

A solution of 1 wt % Irgacure PAG 290 in benzyl alcohol was prepared. The solution contained 1 wt % perylene with respect to benzyl alcohol. The initial pH was 4.5 and had fallen to 1.4 24 hours after activation. To this solution 35 wt % of water was added after 24 hours and the pH of the water was measured to be 4.4

Example 3

A solution of 1 wt % Speedcure 938 in ethanol was prepared. The solution contained 1 wt % perylene. The initial pH was measured to be 5.5, and this fell to one 24 hours after activation. To this solution, 35 wt % of water was added after 24 hours and the pH of the water was measured to be 2.6.

A solution of 20 wt % Speedcure 938 in ethanol was prepared. The solution contained 1 wt % perylene. The initial pH was measured to be 5, and this fell to 0.15 24 hours after activation. To this solution, 35 wt % of water was added after 24 hours and the pH of the water was measured to be 1.6.

Example 4

In a similar way to Example 1, a 10% w/w solution of Di-phenyl iodonium hexafluorophosphate with 1% w/w perylene was prepared in benzyl alcohol. The solution was activated by exposure to light and then subsequently brought into contact with an aqueous based, high viscosity medium (HVMT) comprising an admixture of carboxymethyl cellulose and carbopol and the pH of the HVMT was measured over time to track the migration of the hydrogen ions through the HVMT from the PAG solution.

| Time PAG solution exposed to light | PAG:HVMT (wt %/wt %) | pH at t = 0 | pH after 1 hour | pH after 24 hours | Final pH |
|---|---|---|---|---|---|
| 24 hours | 3:1 | 5.0 | 3.4 | 1.8 | 1.5 after 2 days |
| 144 hours | 3:1 | 5.2 | 1.5 | 0.5 | |
| 144 hours | 1:1 | 5.0 | 2.1 | 0.8 | |
| 1 hour | 2:1 | 5.0 | 4.2 | 2.7 | 1.7 after 2 days |

Example 5

A 1% w/w solution of Irgacure 103 with 1% w/w perylene was prepared in ethanol. The initial pH of the solution was 6.5, which dropped to 0.6 24 hours after exposure to light. To this solution, 35 wt % of water was added after 24 hours and the pH of the water was measured to be 2.6.

A 1% w/w solution of Irgacure 103 with 1% w/w perylene was prepared in benzyl alcohol. The initial pH of the solution was 6.2, which dropped to 0.3 24 hours after exposure to light. To this solution, 50 wt % of water was added after 24 hours and the pH of the water was measured to be 3.4

A 10% w/w solution of Irgacure 103 without perylene was prepared in ethanol. The pH of the solution was 2.5 four hours after exposure to light, which dropped to 0 24 hours after exposure to light. To this solution, 75 wt % of water was added after 24 hours and the pH of the water was measured to be 3.6.

It is apparent from this example that the use of a photosensitiser is not a strict requirement and that suitable PAGs may be used that do not require a photosensitiser.

Example 6

A 1% w/w solution of Irgacure 121 with 1% w/w perylene was prepared in benzyl alcohol. The initial pH of the solution was 4.0, which dropped to 0.1 24 hours after exposure to light. To this solution, 50 wt % of water was added after 24 hours and the pH of the water was measured to be 3.6.

A 1% w/w solution of Irgacure 121 with 1% w/w perylene was prepared in benzyl alcohol. The initial pH of the solution was 4.0, which dropped to 0.1 24 hours after exposure to light. To this solution, 50 wt % of water was added after 24 hours and the pH of the water was measured to be 3.6.

It can be clearly seen from each of the Examples that it is possible to generate large drops in pH by exposing PAGs to light, and that the hydrogen ions generated are able to diffuse through hydrogels and cause a drop in the pH of the hydrogels. Thus, it is possible to use photoinitiated acid generators to start the timing mechanism of a time-temperature integrating indicator label. Although a photosensitiser may be used in conjunction with the PAG, it is possible to generate hydrogen ions from PAGs without the use of a photosensitiser.

pH Reactive Hydrogels

In order to demonstrate the ability of hydrogels to de-swell in response to drops in pH, a number of exemplary hydrogels were investigated.

Example 7

The first hydrogels studied comprised polymers of carboxyethyl acrylate using a polyethylene diacrylate (PEGDA) cross-linking agent. The Q values represent the relative swelling due to adsorption of water (numbers greater than one) or shrinking due to expulsion of water (numbers less than one).

| Sample | % PEGDA (w/w) | % Water (w/w) | Q (pH 6.5) | Q (pH 3) |
|---|---|---|---|---|
| 1 | 1 | 0 | 5.7 | 0.99 |
| 2 | 1 | 30 | 3.7 | 0.7 |

-continued

| Sample | % PEGDA (w/w) | % Water (w/w) | Q (pH 6.5) | Q (pH 3) |
|---|---|---|---|---|
| 3 | 1 | 50 | 3.1 | 0.57 |
| 4 | 5 | 0 | 1.23 | 1.00 |
| 5 | 5 | 10 | 1.7 | 0.78 |
| 6 | 5 | 30 | 1.15 | 0.65 |

1. 100 wt % (99% mol BCEA and 1% mol PEGDA);
2. 70 wt % (99% mol BCEA and 1% mol PEGDA) and 30 wt % water;
3. 50 wt % (99% mol BCEA and 1% mol PEGDA) and 50 wt % water;
4. 100 wt % (95% mol BCEA and 5% mol PEGDA);
5. 90 wt % (95% mol BCEA and 5% mol PEGDA) and 10 wt % water; and
6. 70 wt % (95% mol BCEA and 5% mol PEGDA) and 30 wt % water.

As can be seen, the hydrogels formed with some water already included, namely polymerised with water present, were less prone to absorbing additional water. It should be noted that each sample shrunk when exposed to a lower pH. As such, it can be seen that a plug made from such hydrogel compositions could serve as a valve when exposed to drops in pH.

Example 8

A second type of hydrogels comprising polymers of acrylic acid and N,N'-methylenebisacrylamide as the cross-linking agent were studied. Analogous hydrogels comprising sodium acrylate (SA) can be formed.

| SA:PEGDA (% mole) | Q(pH 5.7) 20% Speedcure 938 in ethanol | Q(pH 5.7) 1% TST/OTf in water | Q (pH 2.10) 0.1M citric acid |
|---|---|---|---|
| 99:1 | 0.55 | 1.5 | 1.6 |
| 95:5 | 0.65 | 3.7 | 1.9 |
| 90:10 | 0.68 | 6.1 | 3.0 (2 h) 1.0 |

Example 9

A hydrogel formed via the co-polymerisation of sodium acrylate 30 wt % and 2-(2-ethoxyethoxy-ethyl acrylate (EOEOEA) 70 wt %, using PEGDA as the cross-linking agent in the amount of 1 wt % provide a Q value of greater than 8.0 at pH 6.75. The Q value was 1.83 in 1% Speedcure 938 in ethanol at pH 6.3, and the Q value was 1.40 in 50 wt % triarylsulphonium salts in propylene carbonate.

Where the amount of PEGDA was increased to 5 wt %, the same monomer mix produced a hydrogel with a Q value of 2.6 at pH 6.75 and a Q value of 1.25 in 50 wt % triarylsulphonium salts in propylene carbonate.

Similar suppression of Q values can be obtained through the addition of sodium chloride to the HVMT and the degree of swelling of the hydrogel can be reduced from greater than 8 to around 1.5. The hydrogels show volume transition from water (ph 5.5) to acidic aqueous solutions acidified with a PAG solution (10 wt % Igracure 103 in benzyl alcohol). As such, it is clear that the acid produced by the PAG can lead to a shrinkage of the hydrogels.

The present invention provide for a reliable time-temperature integrating (TTi) indicator label that may be initiated by exposure to light. The use of a photoinitiated timing mechanism avoids the disadvantages of the activation means of the prior art.

The invention claimed is:

1. A time-temperature integrating (TTi) indicator label comprising:
    an initiator reservoir;
    a target reservoir, said initiator reservoir containing a photoinitiated pH modification system and said target reservoir comprising a pH responsive indicator; and
    an accumulator reservoir, the initiator reservoir, the target reservoir, and the accumulator reservoir being arranged in series, initiator reservoir to accumulator reservoir to target reservoir, wherein the accumulator reservoir and the target reservoir are separated by a stimuli-responsive hydrogel polymer plug.

2. The label according to claim 1, further characterised in that said initiator reservoir is at least partially filled with a hydrogel polymer.

3. The label according to claim 1, wherein the initiator reservoir comprises a PAG, a solvent, and, optionally, a photosensitiser.

4. The label according to claim 1, further characterised in that at least a portion of said initiator reservoir is arranged such that it can be exposed to light.

5. The label according to claim 1, wherein said initiator and accumulator reservoirs are separated by a first stimuli-responsive hydrogel polymer plug, and said accumulator and target reservoirs are separated by a second stimuli-responsive hydrogel polymer plug, optionally
    wherein said first stimuli-responsive hydrogel polymer plug and said second stimuli-responsive hydrogel polymer plug comprise different hydrogel polymers, or
    further characterised in that said first stimuli-responsive hydrogel polymer plug and said second stimuli-responsive hydrogel polymer plug are both responsive to the same stimulus or further characterised in that said first stimuli-responsive hydrogel polymer plug and said second stimuli-responsive hydrogel polymer plug are responsive to different stimuli, optionally
    wherein said first stimuli-responsive hydrogel polymer plug and said second stimuli-responsive hydrogel polymer plug are both responsive to different levels of the same stimulus, optionally
    wherein said stimuli-responsive hydrogel polymer plugs comprise pH responsive hydrogel polymers.

6. The label according to any of claim 1, further characterised in that said accumulator reservoir is at least partially filled with a further hydrogel polymer and or a high viscosity medium.

7. The label according to claim 1, wherein said pH modification system comprises an acid generation system.

8. The label according to claim 7, further characterised in that said initiator and target reservoirs are separate portions of the same physical reservoir or said initiator and target reservoirs are physically separate, distinct reservoirs.

9. The label according to any of claim 7, further characterised in that said acid generation system comprises a photo-initiated acid generation system.

10. The label according to claim 9, further characterised in that said photo-initiated acid generation system comprises a photo acid generator (PAG) and optionally wherein said PAG comprises an onium salt, an arylketosulphinate, an o-nitrobenzyl ester, a napthoquinone diazide, or an oximinosulphonate.

11. The label according to any of claim 1, further characterised in that said target reservoir further contains one or more pH reactive inks, said one or more pH reactive inks fulfilling the role of said acid responsive indicator.

12. The label according to claim 11, wherein said pH reactive inks are entrapped within a polymer matrix contained within said target reservoir, optionally
  wherein said polymer matrix comprises a UV cured polymer matrix.

13. The label according to claim 12, further characterised in that said stimuli-responsive hydrogel polymers are selected from the group comprising poly (vinyl alcohol)/poly (acrylic acid) [PVA/PAA]; poly (methacrylic acid) [PMAA] and 2-(dimethylamino) ethylmethacrylate/N-vinyl pyrrolidone [DNAEMA/NVP].

14. The label according to claim 12, wherein photo-initiated acid generation system comprises a photosensitiser, optionally
  wherein the photosensitiser is perylene, oprtionally
  wherein the perylene is included in an amount of from around 0.5 wt % to around 5 wt %, preferably around 1 wt %.

15. A time-temperature indicator label comprising first and second reservoirs separated by a hydrogel valve, said valve allowing passage of an acid from said first reservoir to said second reservoir when the hydrogel valve is activated, and further comprising a third reservoir, wherein the third reservoir is separated from the second reservoir by a stimuli-reactive hydrogel plug.

16. The label according to claim 15, wherein the hydrogel valve is opened by exposure to light and/or heat.

17. The label according to claim 15, wherein the hydrogel valve is opened by exposure to light.

18. The label according to claim 15, wherein the second reservoir comprises a high viscosity medium.

19. The label according to claim 15, wherein the first reservoir comprises an acidic solution.

20. The label according to claim 19, wherein the hydrogel comprising the hydrogel valve shrinks or de-swells on exposure to light and allows the acidic solution to pass into the second reservoir.

21. A label according to claim 15, wherein the stimuli reactive hydrogel plug is pH reactive and shrinks or de-swells at a predetermined pH.

22. The label according to any of claim 21, wherein the third reservoir comprises a pH responsive indicator.

* * * * *